(12) United States Patent
Ohashi et al.

(10) Patent No.: US 6,470,763 B2
(45) Date of Patent: Oct. 29, 2002

(54) SHIFT CONTROL DEVICE FOR AUTOMATIC TRANSMISSION

(75) Inventors: Tatsuyuki Ohashi, Wako (JP); Yoshiharu Saito, Wako (JP); Hideki Wakamatsu, Wako (JP); Toru Yamashita, Wako (JP); Takayuki Yamaguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 09/834,961

(22) Filed: Apr. 16, 2001

(65) Prior Publication Data

US 2001/0054532 A1 Dec. 27, 2001

(30) Foreign Application Priority Data

May 1, 2000 (JP) ........................................ 2000-131984

(51) Int. Cl.[7] .............................................. F16H 61/00
(52) U.S. Cl. ........................... 74/335; 192/3.58; 192/51
(58) Field of Search ............................... 74/335, 336 R; 192/3.58, 51

(56) References Cited

U.S. PATENT DOCUMENTS 5,437,204 A * 8/1995 Person ........................ 74/335
5,593,365 A * 1/1997 Tabata et al. ................ 477/119
5,785,628 A * 7/1998 Kamada et al. ............. 477/130
6,131,475 A * 10/2000 Riedhammer ................ 74/335

FOREIGN PATENT DOCUMENTS

| JP | 6-264996 | 9/1994 |
|---|---|---|
| JP | 9-269062 | 10/1997 |

* cited by examiner

Primary Examiner—Rodney H. Bonck
(74) Attorney, Agent, or Firm—Armstrong, Westerman & Hattori, LLP

(57) ABSTRACT

The present invention provides a shift control valve that controls the supply of engagement control hydraulic pressure to a drive friction engagement element and a reverse friction engagement element, having first and second main pressure oil lines (such as oil lines 151, 152, and 155) provided in parallel between a manual valve 58 and an oil line 100 (main pressure supply source) linked to a main regulator valve 50, oil lines 121, 122, and 156 that connect the manual valve 58 to a LOW clutch 11, and oil lines 130, 131, 132, and 133 that connect the manual valve 58 to a reverse clutch 14, and a first linear solenoid valve 86 (linear A) that allows the main pressure to be set as desired being provided to at least one of the first and second main pressure oil lines.

8 Claims, 22 Drawing Sheets

SHIFT CONTROL DEVICE FOR AUTOMATIC TRANSMISSION

RELATED APPLICATIONS

This application claims the priority of Japanese Patent Application No. 2000-131984 filed on May 1, 2000, which is incorporated herein by reference.

1. Field of the Invention

The present invention relates to a control device for an automatic transmission, with which a shift control valve equipped with a manual valve and the like and operating according to the movement of a shift lever by the driver performs switching between a reverse range, neutral range, and drive range, and performs automatic shift control in the reverse and drive ranges.

2. Background of the Invention

With a vehicle equipped with an automatic transmission such as this, the driver moves a shift lever, which actuates a manual valve, which selects the shift range (or shift position), and shift control is automatically carried out within this selected shift range on the basis of the amount of accelerator pedal depression, vehicle speed, and so forth. The shift ranges that can be selected by movement of the shift lever are the park range (P range), reverse range (R range), neutral range (N range), and drive range (such as the D range), with the drive range frequently consisting of a number of ranges, such as the D range, S range, 2 range, and 1 range.

An automatic transmission is designed such that automatic shift control is performed by providing a plurality of solenoid valves, shift valves, and so forth to friction engagement elements (such as clutches) for setting the various gear speeds from the manual valve, and controlling the operation of the shift valves with the solenoid valves, in order to perform shift control automatically on the basis of the amount of accelerator pedal depression, vehicle speed, and so forth within each shift range set by the operation of the manual valve as above. Shift control device structures such as this are disclosed, for example, in Japanese Laid-Open Patent Applications H6-264996 and H9-269062.

With an automatic transmission control device such as this, an oil line going through a solenoid valve, a shift valve, and so forth is switched for every range set by the manual valve, so numerous solenoid valves, shift valves, and the like are needed, which is a problem in that a greater number of parts in the control device tends to lead to higher cost.

In particular, the manual valve switches between the drive and reverse ranges by switching the hydraulic supply oil line going to the drive friction engagement element and the hydraulic supply oil line going to the reverse friction engagement element. Accordingly, the solenoid valve, shift valve, and so forth provided to the hydraulic supply oil line linked to the drive friction engagement element need to be provided separately from the solenoid valve, shift valve, and so forth provided to the hydraulic supply oil line linked to the reverse friction engagement element, which tends to drive up the cost of the control device, and also requires independent control for drive and reverse, making the control more difficult.

SUMMARY OF THE INVENTION

It is an object of the present invention to provide a shift control device for an automatic transmission, structured such that the solenoid valve, shift valves, and so forth used for shift control in the drive and reverse shift ranges can be partially shared, allowing the structure of the control device to be simpler, and affording optimal shift control in each range.

To achieve the stated object, the shift control device for an automatic transmission pertaining to the present invention has a power transmission mechanism (such as a parallel shaft transmission TM in the embodiments) comprising a drive power transmission path for transmitting drive force, and a reverse power transmission path for transmitting reverse power; a drive friction engagement element (such as a LOW clutch 11 in the embodiments) for selecting the drive power transmission path and a reverse friction engagement element (such as a $4^{th}$ clutch 14 in the embodiments) for selecting the reverse power transmission path; and a hydraulic control valve (such as a shift control valve CV in the embodiments) for controlling the supply of engagement control hydraulic pressure to the drive friction engagement element and the reverse friction engagement element. This hydraulic control valve has a main pressure supply source (such as a main regulator valve 50, oil line 100, etc., in the embodiments) for supplying the main pressure of the engagement control hydraulic pressure a manual valve (such as a manual valve 58 in the embodiments) that is switched according to shift lever operation, first and second main pressure oil lines (such as oil lines 151, 152, 155, etc., in the embodiments) disposed in parallel between the main pressure supply source and the manual valve, and a plurality of engagement element oil lines (such as oil lines 121, 122, 156, 130, 131, 132, 133, etc., in the embodiments) disposed between the manual valve and the drive and reverse friction engagement elements. Also, a linear solenoid valve (such as a first linear solenoid valve 86, that is, linear A, in the embodiments) that allows the main pressure to be set as desired is provided to at least one of the first and second main pressure oil lines.

With a shift control device for an automatic transmission structured such as this, the engagement control hydraulic pressure from the first and second main pressure oil lines can be selectively supplied to the drive friction engagement element or the reverse friction engagement element on the basis of the operation of the manual valve. Specifically, the first and second main pressure oil lines can be used for both drive and reverse control, so fewer parts are needed for the shift control device, and control is simpler.

Accordingly, it is preferable if the above-mentioned first and second main pressure oil lines are linked to the drive friction engagement element when the manual valve is in the drive position, and are linked to the reverse friction engagement element when the manual valve is in the reverse position.

With the present invention, if the first and second main pressure oil lines are used selectively, it is possible, for example, to control the start of engagement by precisely controlling the engagement hydraulic pressure using a main pressure oil line having a linear solenoid valve, and upon completion of the engagement start control, to supply the line pressure directly using another main pressure oil line, so that the friction engagement element is securely engaged. As a result, the linear solenoid valve is controlled at a lower pressure, and the structure thereof can be simpler. Furthermore, even if there is a malfunction of the linear solenoid valve, the friction engagement element can still be engaged by using the other main pressure oil line, so reliability is better.

It is also preferable if a mechanical clutch mechanism (such as a dog-tooth clutch 16 in the embodiments) for mechanically switching the drive power transmission path and the reverse power transmission path, and a drive/reverse selection hydraulic servo mechanism (such as a drive/reverse selection hydraulic servo mechanism 70 in the embodiments) that hydraulically controls the operation of this mechanical clutch mechanism, are provided, and if the drive/reverse selection hydraulic servo mechanism is disposed within the hydraulic control valve, and the reverse engagement element oil line that connects the reverse friction engagement element to the manual valve is formed through the drive/ reverse selection hydraulic servo mechanism operating on the reverse side. This keeps the reverse friction engagement element from being engaged unless the drive/reverse selection hydraulic servo mechanism is switched to the reverse side, which improves reliability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
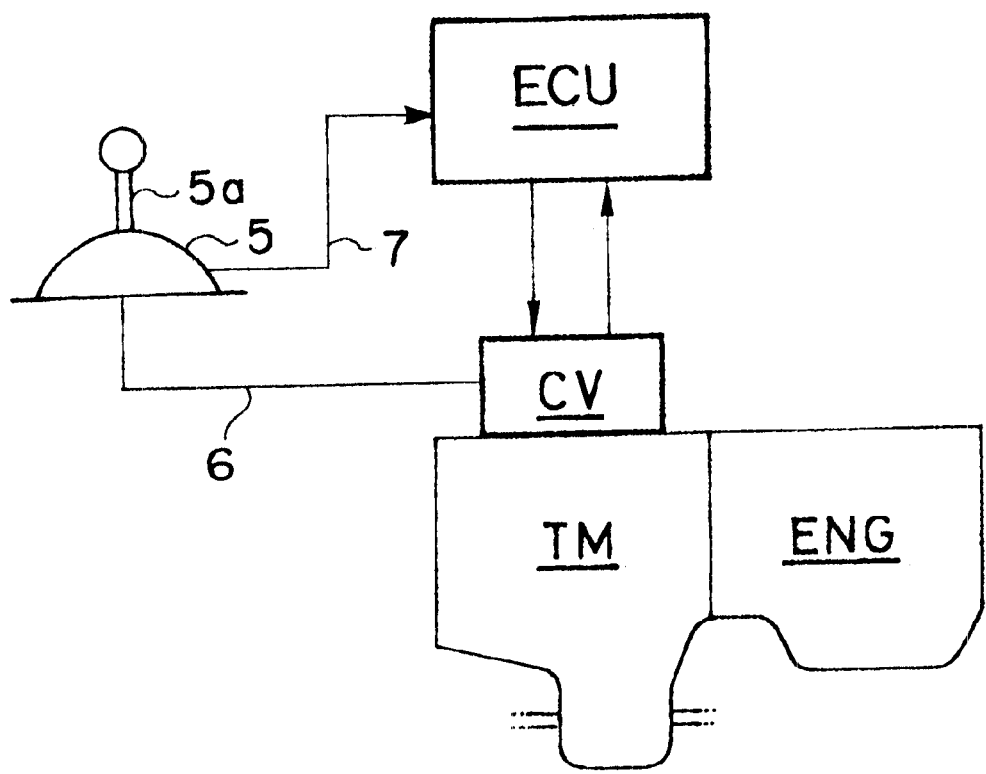
FIG. 1 is a schematic block diagram of the overall structure of the control device pertaining to the present invention, and an automatic transmission controlled by this device.

A shift control device pertaining to a preferred embodiment of the present invention, and an automatic transmission in which the range switching is controlled by this device, will now be described through reference to the drawings. FIG. 1 shows the overall structure of the automatic transmission pertaining to the present invention, in which the power transmission mechanism is constituted by an automatic transmission TM that transmits the output of an engine ENG at different speeds to the wheels. The shift control of this automatic transmission TM is performed hydraulically by a shift control valve CV, and the operation of the shift control valve CV is accomplished by actuating a solenoid valve with a shift control signal from an electronic control unit ECU. The electronic control unit ECU is linked to a shifter device 5 via a signal line 7, and receives signals from the shifter device 5 indicating the shift position of a shift lever 5a. The shift lever 5a is linked to a manual valve inside the shift control valve CV via a cable 6, and a spool of the manual valve is moved according to the movement of the shift lever 5a.

First, let us describe the structure of the automatic transmission TM through reference to FIGS. 2 to 5. This transmission comprises a transmission housing HSG, inside of which are disposed a torque converter TC linked to an engine output shaft (not shown), a parallel shaft transmission mechanism TM linked to an output member (turbine) of the torque converter TC, and a differential mechanism DF having a final reduction driven gear 6b that meshes with a final reduction drive gear 6a of this transmission mechanism TM. Drive force is transmitted from the differential mechanism DF to the left and right wheels.

Figure 2:
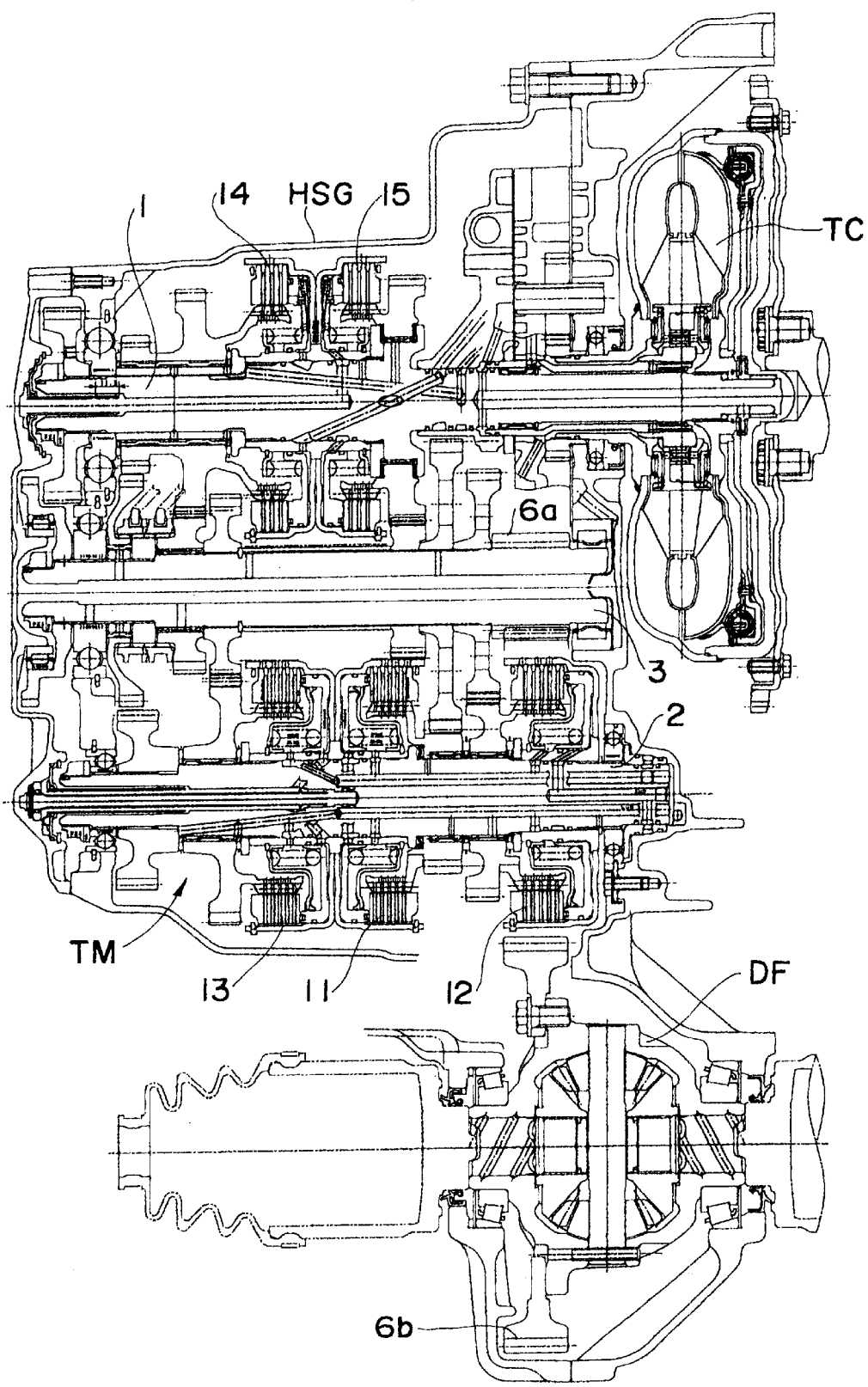
FIG. 2 is a cross section of a five-speed automatic transmission that is shift controlled by the control device pertaining to the present invention.
Figure 3:
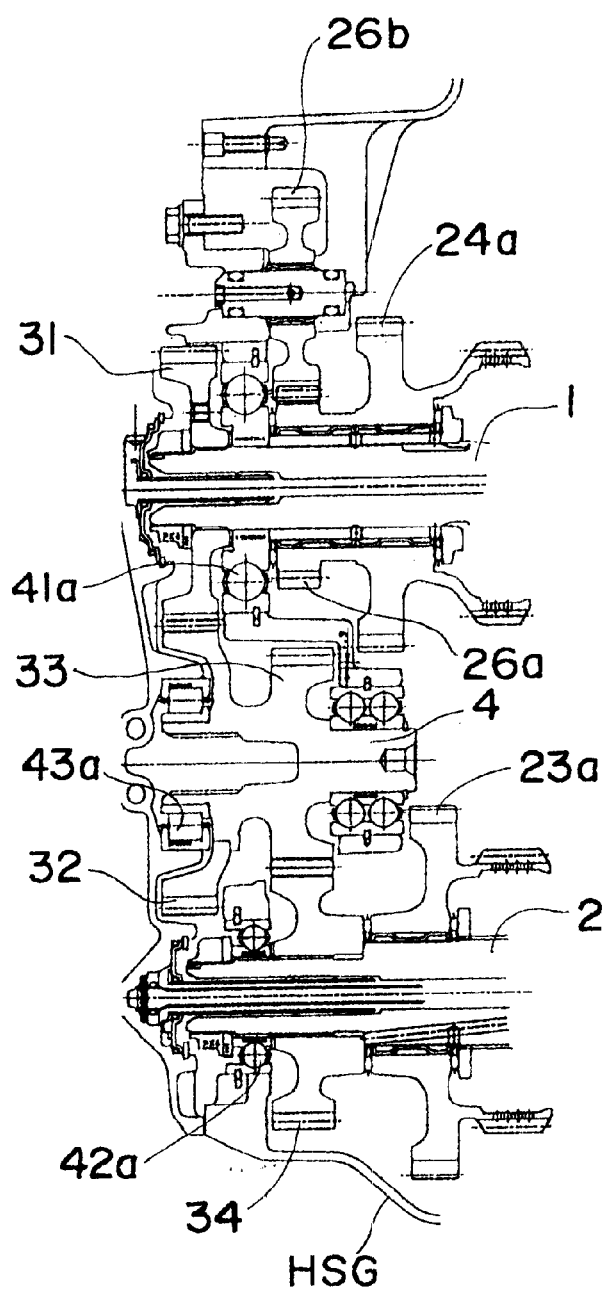
FIG. 3 is a partial cross section of the above-mentioned five-speed automatic transmission.
Figure 4A:
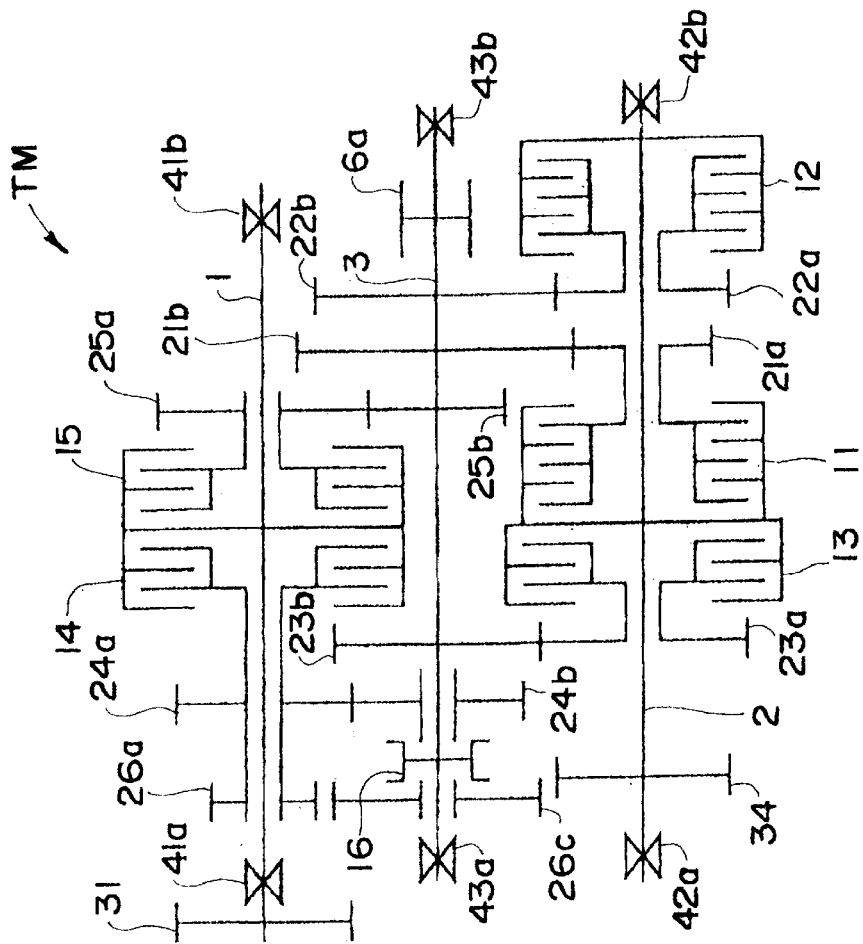
FIG. 4A and 4B show skeleton diagrams illustrating the power transmission system of the above-mentioned five-speed automatic transmission.
Figure 4B:
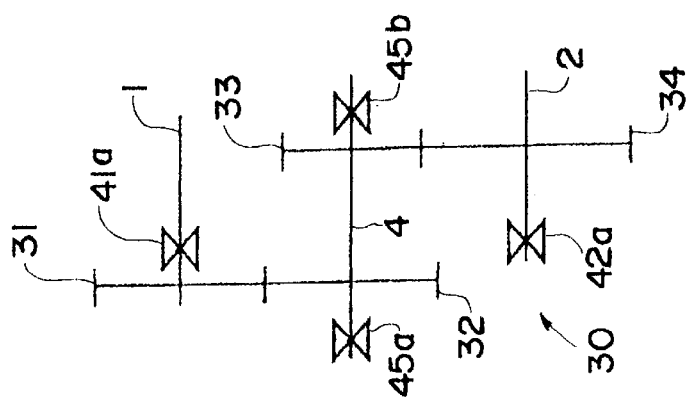
Figure 5:
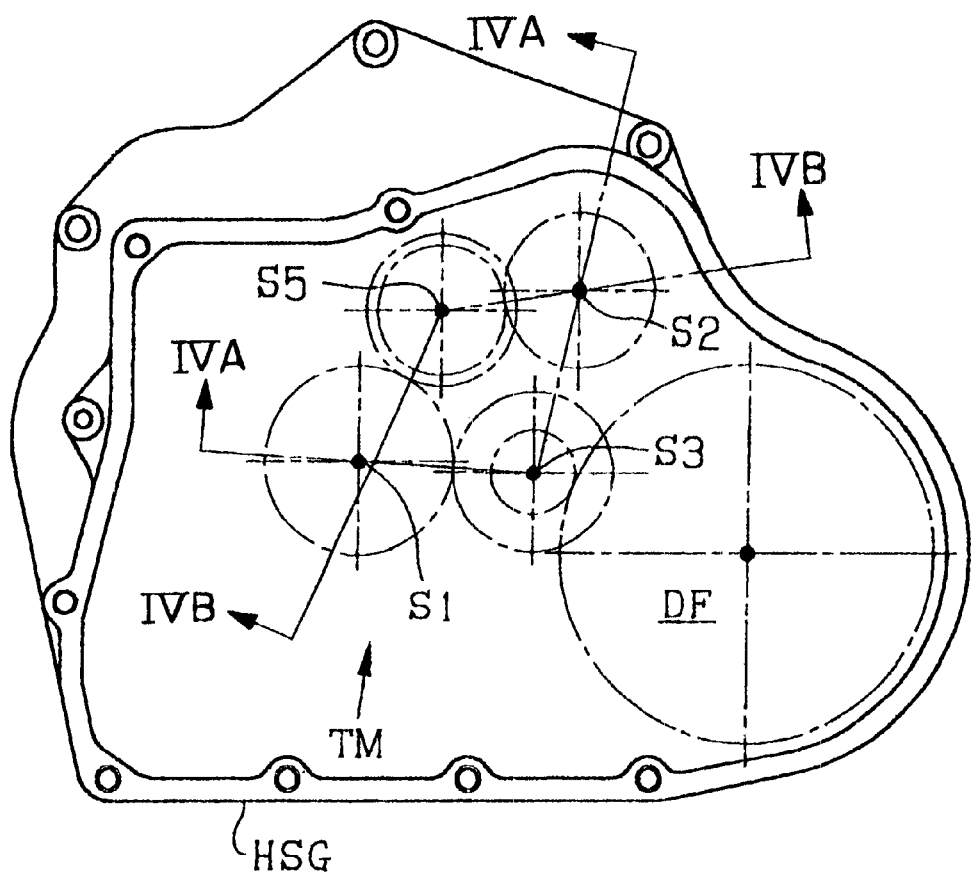
FIG. 5 is a schematic diagram illustrating the shaft positional relationship of the above-mentioned five-speed automatic transmission.
Figure 6:
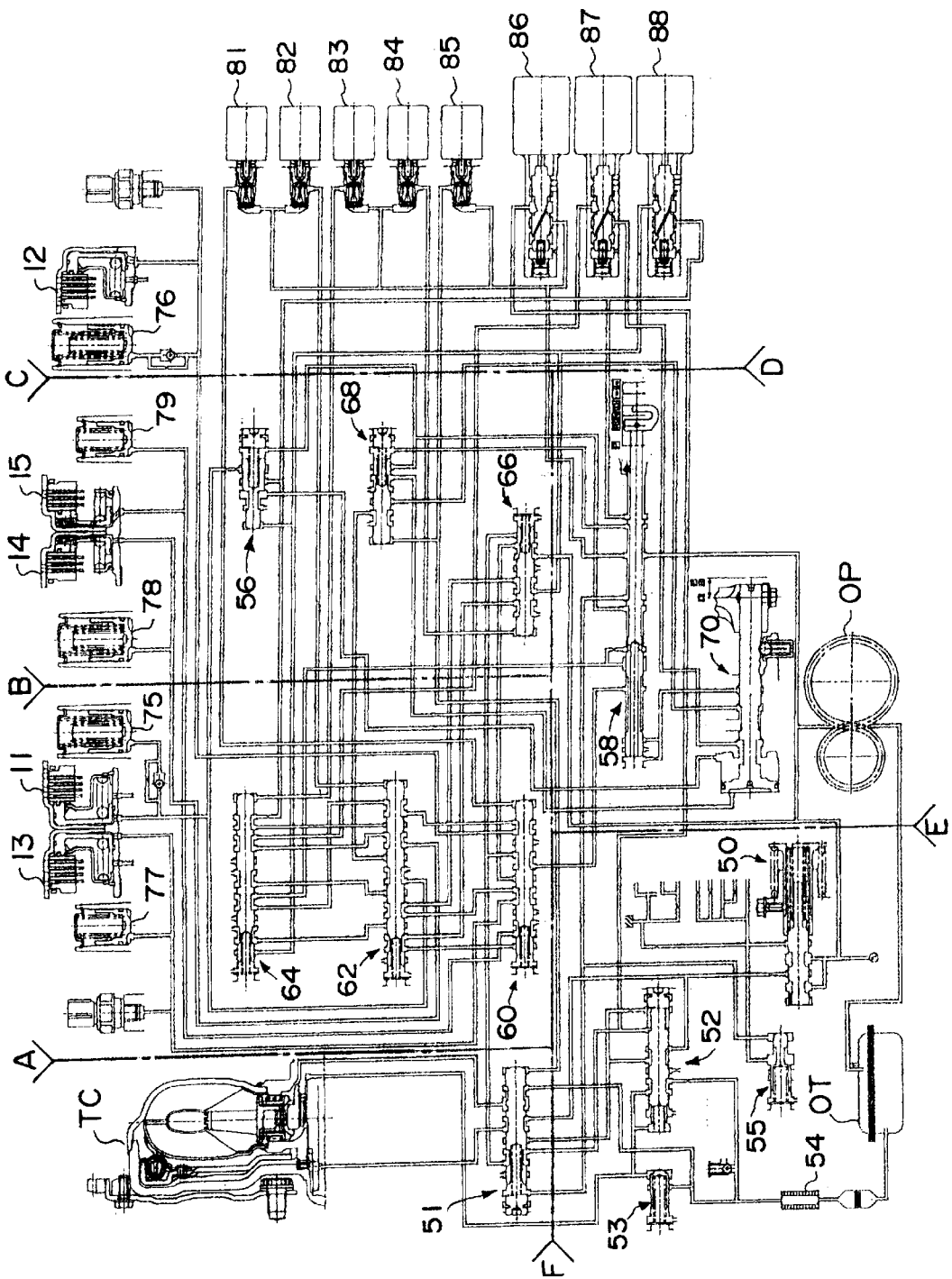
FIG. 6 is a hydraulic circuit diagram illustrating the structure of the shift control device in the above-mentioned five-speed automatic transmission.
Figure 7:
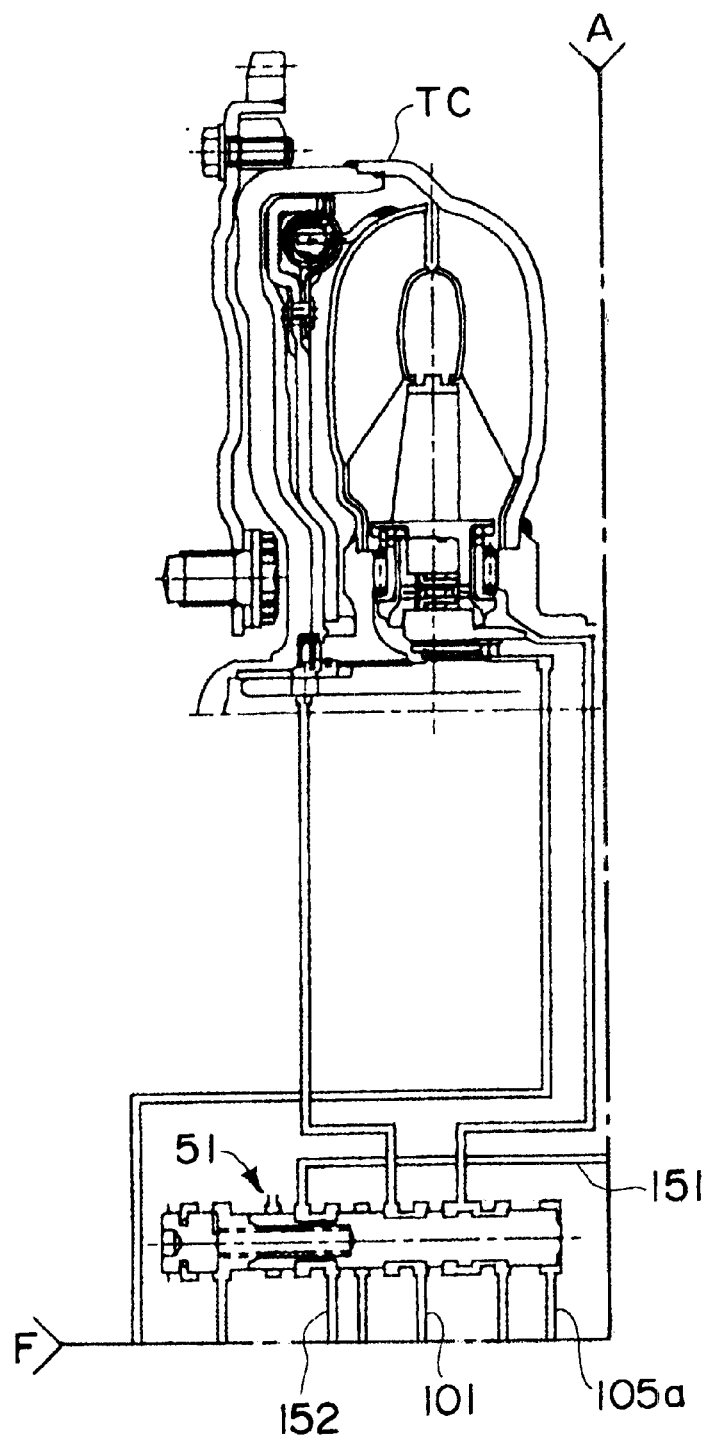
FIGS. 7 to 12 are hydraulic circuit diagrams illustrating enlarged detail views of the hydraulic circuit in FIG. 6.
Figure 8:
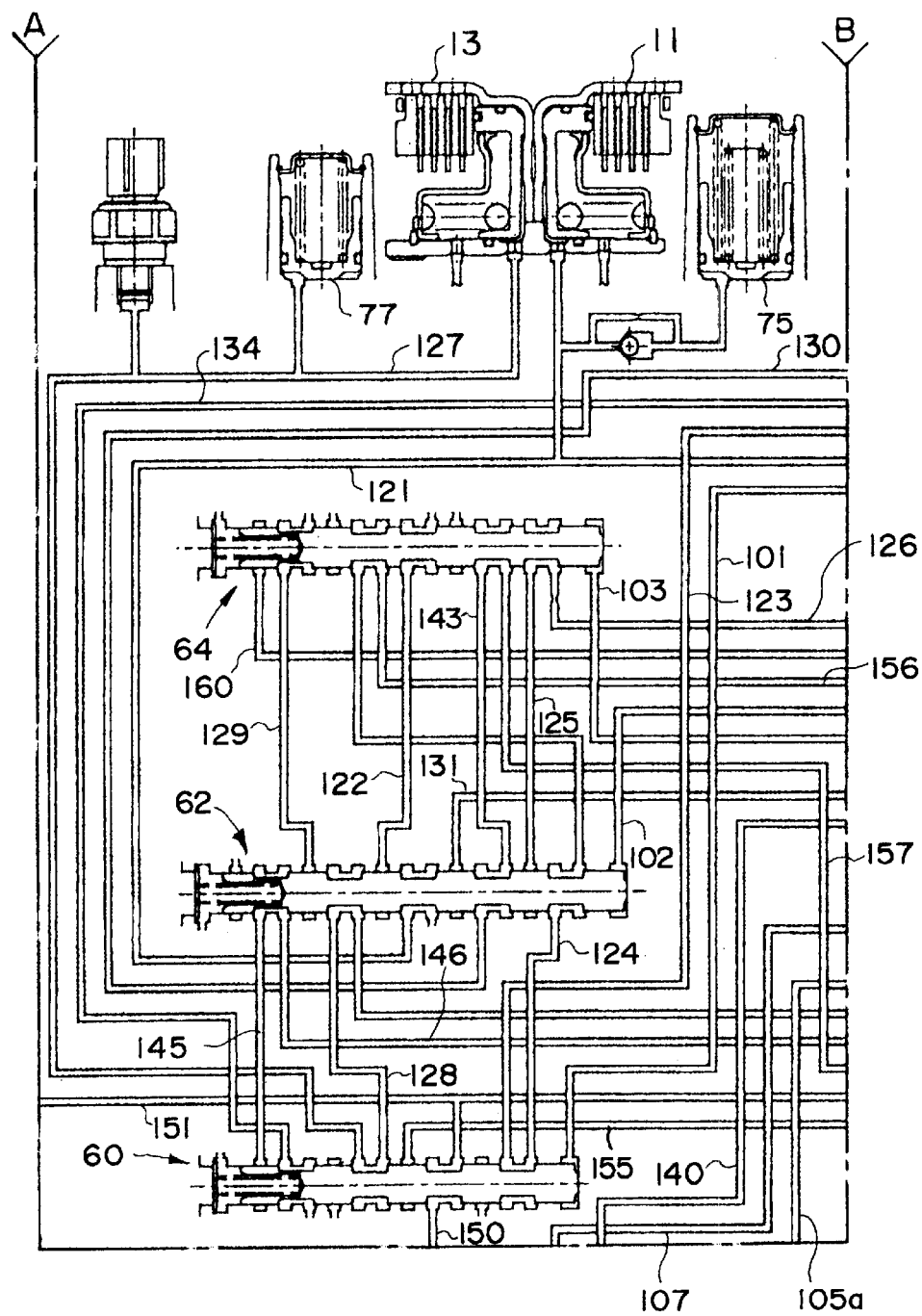
Figure 9:
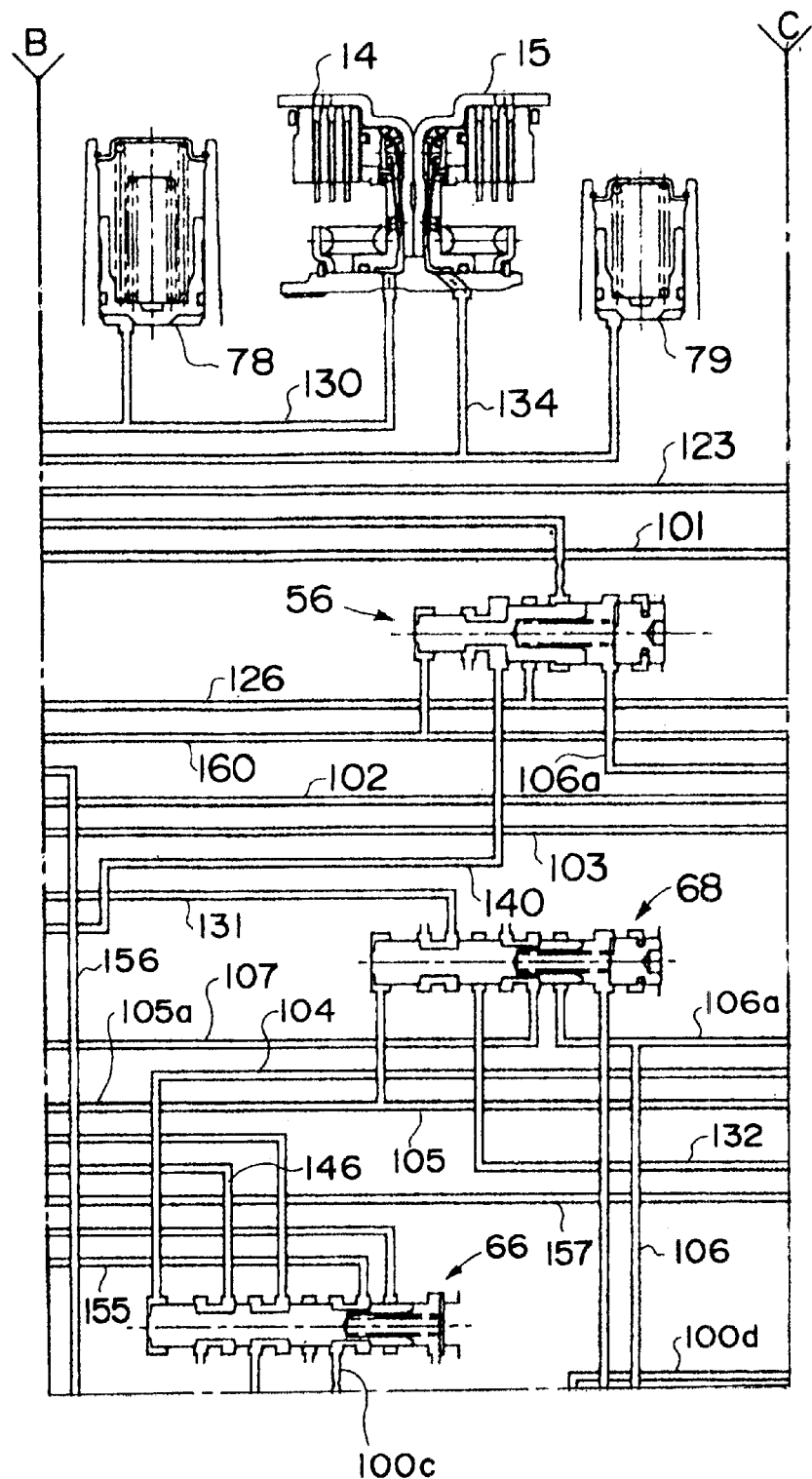
Figure 10:
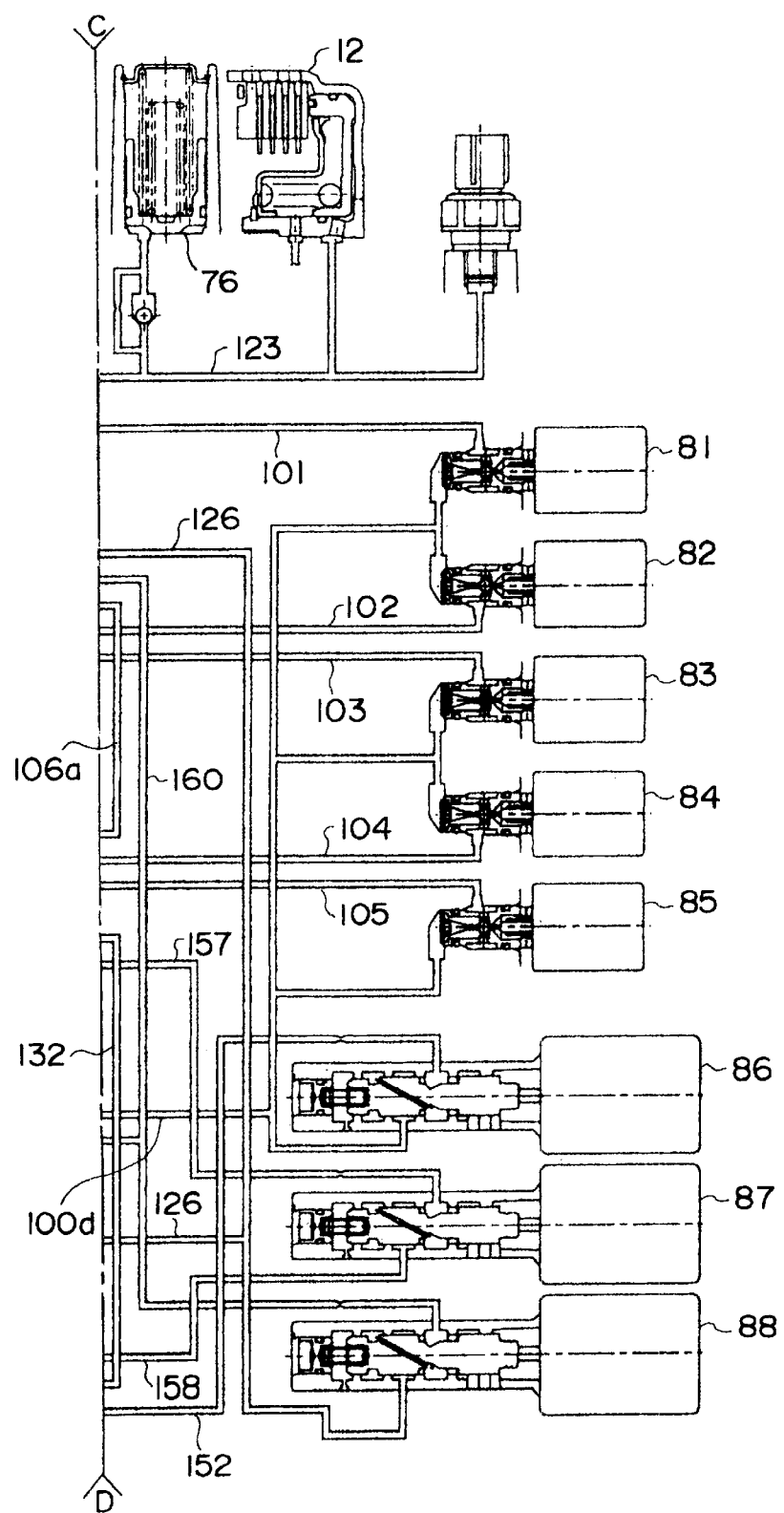
Figure 11:
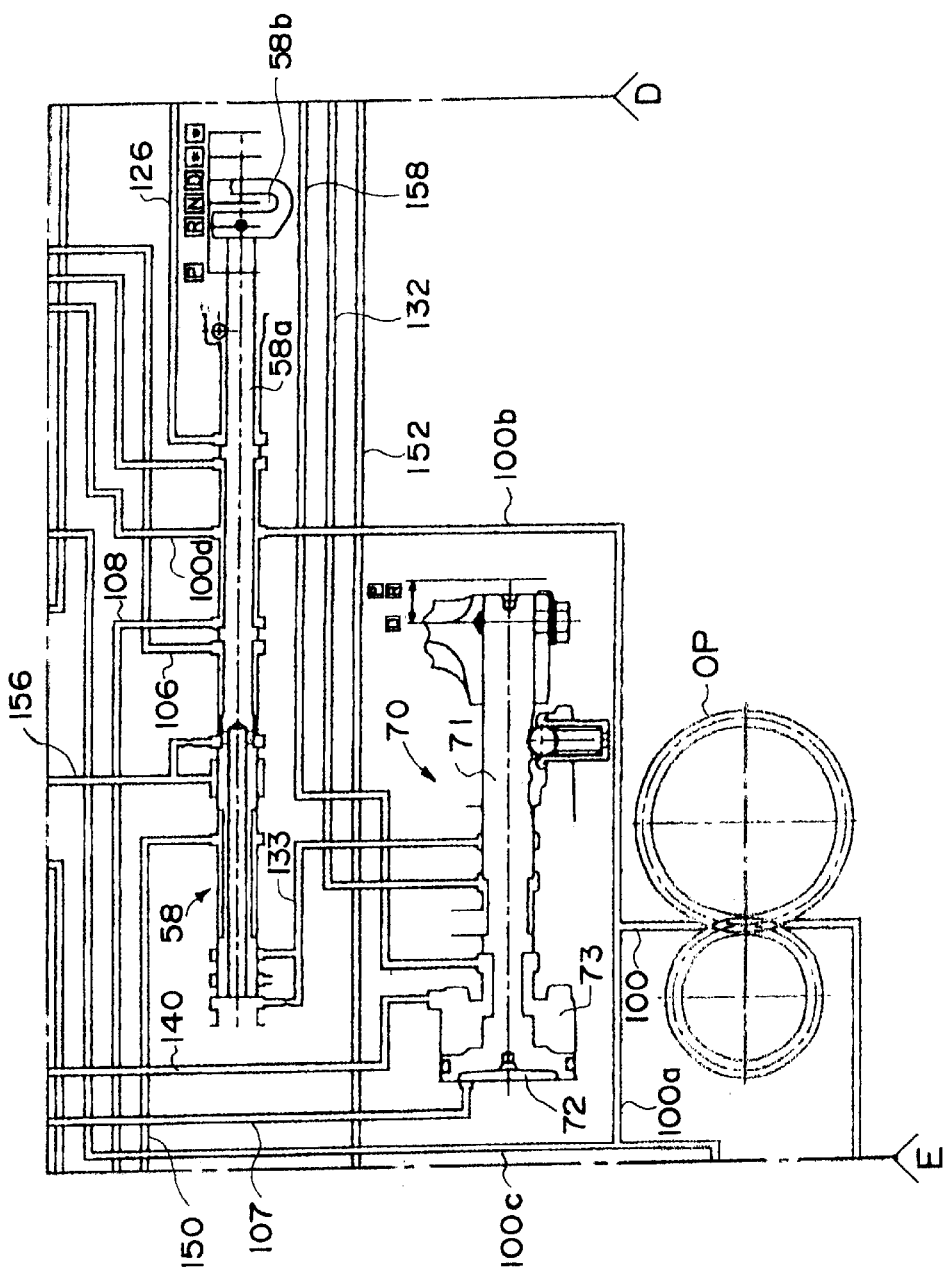
Figure 12:
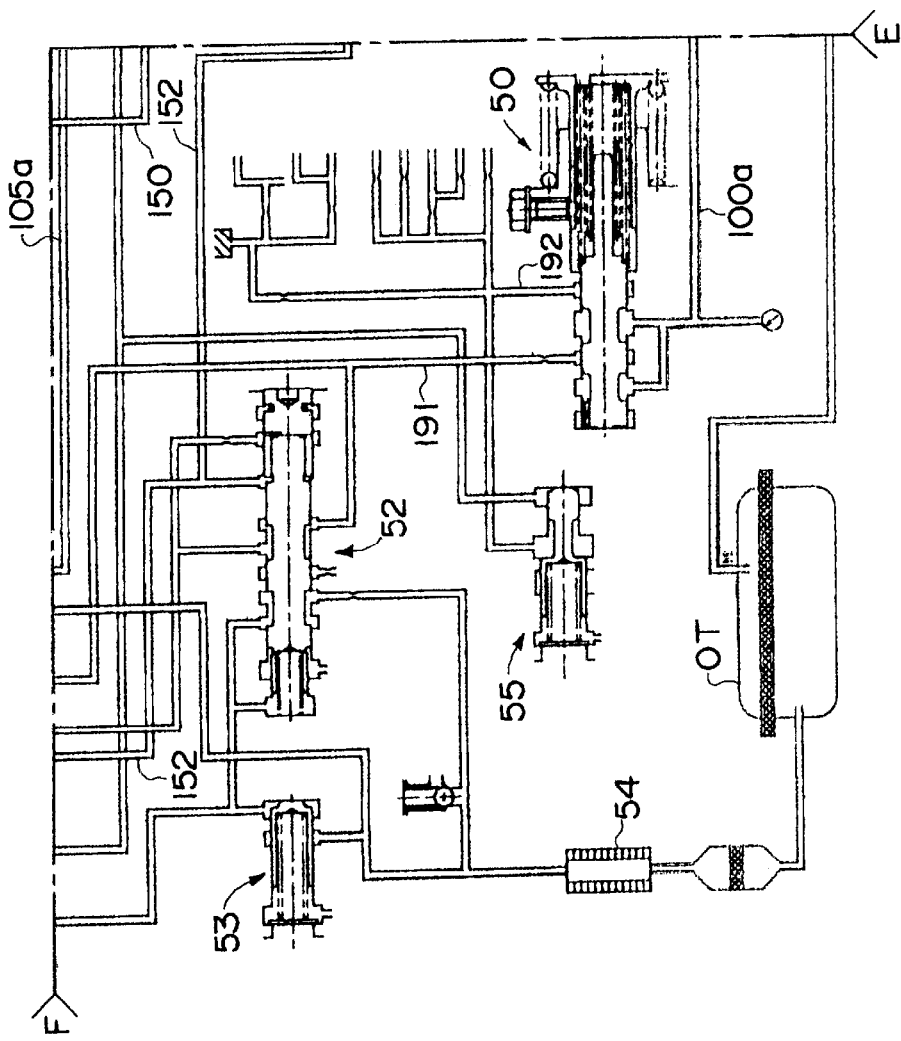

The parallel shaft transmission mechanism TM has a first input shaft 1, a second input shaft 2, a countershaft 3, and an idle shaft 4 extending parallel to each other, and the centerline positions of these shafts are indicated by S1, S2, S3, and S5, respectively, in FIG. 5. The power transmission structure of this parallel shaft transmission mechanism TM is shown in FIGS. 4A and 4B. FIG. 4A is a cross section through the first input shaft 1 (S1), the countershaft 3 (S3), and the second input shaft 2 (S2) along the IVA—IVA line in FIG. 5, while FIG. 4B is a cross section through the first input shaft 1 (S1), the idle shaft 4 (S4), and the second input shaft 2 (S2) along the IVB—IVB line in FIG. 5. FIG. 2 is a cross section of the transmission mechanism TM corresponding to FIG. 4A, and FIG. 3 is that corresponding to FIG. 4B.

The first input shaft 1 is coupled to the turbine of the torque converter TC, is rotatably supported by bearings 41a and 41b, receives the drive force from the turbine, and rotates along with the turbine. The first input shaft 1 is provided with a fifth-speed drive gear 25a, a $5^{th}$ clutch 15, a $4^{th}$ clutch 14, a fourth-speed drive gear 24a, a reverse drive gear 26a, and a first connecting gear 31, in that order starting from the torque converter TC side (the right side in the drawing). The fifth-speed drive gear 25a is rotatably provided on the first input shaft 1, and is engaged with and disengaged from the first input shaft 1 by the hydraulically operated $5^{th}$ clutch 15. The fourth-speed drive gear 24a and the reverse drive gear 26a are integrally linked and rotatably provided on the first input shaft 1, and are engaged with and disengaged from the first input shaft 1 by the hydraulically operated $4^{th}$ clutch 14. The first connecting gear 31 is linked with the first input shaft 1 in a cantilevered state, located to the outside of the bearing 41a rotatably supporting the first input shaft 1.

The second input shaft 2 is rotatably supported by bearings 42a and 42b, and is provided with a $2^{nd}$ clutch 12, a second-speed drive gear 22a, a LOW drive gear 21a, a LOW clutch 11, a $3^{rd}$ clutch 13, a third-speed drive gear 23a, and a fourth connecting gear 34, in that order starting from the right side in the drawing. The second-speed drive gear 22a, the LOW drive gear 21a, and the third-speed drive gear 23a are rotatably provided on the second input shaft 2, and are engaged with and disengaged from the second input shaft 2 by the hydraulically operated $2^{nd}$ clutch 12, LOW clutch 11, and $3^{rd}$ clutch 13. The fourth connecting gear 34 is linked to the second input shaft 2.

The idle shaft 4 is rotatably supported by bearings 45a and 45b, and is provided with a second connecting gear 32 and a third connecting gear 33 that are integral with this shaft. The second connecting gear 32 meshes with the first connecting gear 31, and the third connecting gear 33 meshes with the fourth connecting gear 34. These first to fourth connecting gears constitute a connecting gear train 30, and the rotation of the first input shaft 1 is constantly transmitted to the second input shaft 2 via the connecting gear train 30.

The countershaft 3 is rotatably supported by bearings 43a and 43b, and the final reduction drive gear 6a, a second-speed driven gear 22b, a LOW driven gear 21b, a fifth-speed driven gear 25b, a third-speed driven gear 23b, a fourth-speed driven gear 24b, a dog-tooth clutch 16, and a reverse driven gear 26c are provided on this shaft, in that order starting from the right side in the drawing. The final reduction drive gear 6a, the second-speed driven gear 22b, the LOW driven gear 21b, the fifth-speed driven gear 25b and the third-speed driven gear 23b are linked to and rotate integrally with the countershaft 3. The fourth-speed driven gear 24b is rotatably provided on the countershaft 3. The reverse driven gear 26c is also rotatably provided on the countershaft 3. The dog-tooth clutch 16 operates in the axial direction, and can engage and disengage the fourth-speed driven gear 24b and the countershaft 3, or engage and disengage the reverse driven gear 26c and the countershaft 3.

As shown in the drawings, the LOW drive gear 21a meshes with the LOW driven gear 21b, the second-speed drive gear 22a meshes with the second-speed driven gear 22b, the third-speed drive gear 23a meshes with the third-speed driven gear 23b, the fourth-speed drive gear 24a meshes with the fourth-speed driven gear 24b, and the fifth-speed drive gear 25a meshes with the fifth-speed driven gear 25b. Further, the reverse drive gear 26a meshes with the reverse driven gear 26c via a reverse idler gear 26b (see FIG. 3).

Although not depicted in the drawings, the final reduction drive gear 6a meshes with the final reduction driven gear 6b (see FIG. 2), and the rotation of the countershaft 3 is transmitted to the differential mechanism DF via the final reduction drive gear 6a and final reduction driven gear 6b.

The setting of the various gear speeds and the power transmission routes thereof in a transmission structured as above will now be described. With this transmission, in the drive range, the dog-tooth clutch 16 moves to the right in the drawing, and the fourth-speed driven gear 24b is engaged with the countershaft 3. In the reverse range, the dog-tooth clutch 16 moves to the left, and the reverse driven gear 26c is engaged with the countershaft 3.

First, let us describe the gear speeds in the drive range. Low gear is set by engagement of the LOW clutch 11. The rotational drive force transmitted from the torque converter TC to the first input shaft 1 is transmitted through the connecting gear train 30 to the second input shaft 2. Since the LOW clutch 11 is engaged here, the LOW drive gear 21a is rotationally driven along with the second input shaft 2, the LOW driven gear 21b meshed therewith is rotationally driven, and the countershaft 3 is driven. This drive force is transmitted through the final reduction gear train 6a and 6b to the differential mechanism DF.

Second gear is set by engagement of the $2^{nd}$ clutch 12. The rotational drive force transmitted from the torque converter TC to the first input shaft 1 is transmitted through the connecting gear train 30 to the second input shaft 2. Since the $2^{nd}$ clutch 12 is engaged here, the second-speed drive gear 22a is rotationally driven along with the second input shaft 2, the second-speed driven gear 22b meshed therewith is rotationally driven, and the countershaft 3 is driven. This drive force is transmitted through the final reduction gear train 6a and 6b to the differential mechanism DF.

Third gear is set by engagement of the $3^{rd}$ clutch 13. The rotational drive force transmitted from the torque converter TC to the first input shaft 1 is transmitted through the connecting gear train 30 to the second input shaft 2. Since the $3^{rd}$ clutch 13 is engaged here, the third-speed drive gear 23a is rotationally driven along with the second input shaft 2, the third-speed driven gear 23b meshed therewith is rotationally driven, and the countershaft 3 is driven. This drive force is transmitted through the final reduction gear train 6a and 6b to the differential mechanism DF.

Fourth gear is set by engagement of the $4^{th}$ clutch 14. The rotational drive force transmitted from the torque converter TC to the first input shaft 1 rotationally drives the fourth-speed drive gear 24a through the $4^{th}$ clutch 14, and the fourth-speed driven gear 24b meshed therewith is rotationally driven. Here, in the drive range, the fourth-speed driven gear 24b is engaged with the countershaft 3 by the dog-tooth clutch 16, so the countershaft 3 is driven, and this drive force is transmitted through the final reduction gear train 6a and 6b to the differential mechanism DF.

Fifth gear is set by engagement of the $5^{th}$ clutch 15. The rotational drive force transmitted from the torque converter TC to the first input shaft 1 rotationally drives the fifth-speed drive gear 25a through the $5^{th}$ clutch 15, and the fourth-speed driven gear 24b meshed therewith is rotationally driven. Since the fifth-speed driven gear 25b is engaged with the countershaft 3, the countershaft 3 is driven, and this drive force is transmitted through the final reduction gear train 6a and 6b to the differential mechanism DF.

Reverse gear is set by engaging the $4^{th}$ clutch 14 and moving the dog-tooth clutch 16 to the left. The rotational drive force transmitted from the torque converter TC to the first input shaft 1 rotationally drives the reverse drive gear 26a $4^{th}$ clutch 14, and rotationally drives the reverse driven gear 26c meshed with this gear 26a through the reverse idler gear 26b. Since the reverse driven gear 26c is engaged with the countershaft 3 by the dog-tooth clutch 16 in the reverse range here, the countershaft 3 is driven, and this drive force is transmitted through the final reduction gear train 6a and 6b to the differential mechanism DF. It can be seen from this that the $4^{th}$ clutch 14 doubles as a reverse clutch.

FIGS. 6 to 12 illustrate the hydraulic circuits that make up the shift control valve CV that controls shifting in an automatic transmission structured as above. These drawings will now be described. FIGS. 7 to 12 are enlarged detail views of the six portions of FIG. 6 indicated by one-dot chain lines A to F. In these hydraulic circuit diagrams, places where an oil line is open indicate that the line is connected to a drain.

This device has an oil pump OP that discharges hydraulic oil from an oil tank OT. The oil pump OP is driven by the engine and supplies hydraulic oil to an oil line 100. The oil line 100 is connected to a main regulator valve 50 via an oil line 100a, and the pressure is adjusted at this valve, generating a line pressure PL in the oil lines 100 and 100a. This line pressure PL is supplied through an oil line 100b to a manual valve 58, and is supplied through an oil line 100c to a fourth shift valve 66. The oil line 100a is always connected to an oil line 100d via the port of the manual valve 58 (always connected, regardless of how the manual valve 58 is operating), and the line pressure PL is always supplied through the oil line 100d to first to fifth on/off solenoid valves 81 to 85 and a first linear solenoid valve 86.

Any extra oil from the main regulator valve 50 which makes the line pressure PL is supplied to an oil line 191, as well as to an oil line 192. The hydraulic oil supplied to the oil line 191 is controlled by a lock-up shift valve 51, a lock-up control valve 52, and a torque converter check valve 53, and is used in the lock-up control of the torque converter TC, after which it is returned to the oil tank OT through an oil cooler 54. Since control of the torque converter TC is not directly related to the present invention, it will not be described herein. The hydraulic oil supplied to the oil line 192 is adjusted in pressure by a lubrication relief valve 55 and supplied as lubricating oil to the various components.

The drawings show the first input shaft 1, the $2^{nd}$ clutch 12, the $3^{rd}$ clutch 13, the $4^{th}$ clutch 14, and the $5^{th}$ clutch 15 that make up a part of the above-mentioned transmission, and show a LOW accumulator 75, $2^{nd}$ accumulator 76, $3^{rd}$ accumulator 77, $4^{th}$ accumulator 78, and $5^{th}$ accumulator 79 connected via oil lines to these respective clutches. A drive/reverse selection hydraulic servo mechanism 70 is also provided for actuating the dog-tooth clutch 16.

A first shift valve 60, a second shift valve 62, a third shift valve 64, a fourth shift valve 66, a fifth shift valve 68, and a D inhibitor valve 56 are disposed as shown in the drawings in order to control the supply of hydraulic oil to the various clutches 11 to 15 and the drive/reverse selection hydraulic servo mechanism 70. The first to fifth on/off solenoid valves 81 to 85 and first to third linear solenoid valves 86 to 88 are disposed as shown in the drawings in order to control the supply of hydraulic oil to the various clutches, etc., and to control the operation of these valves.

The operation of a shift control device structured as above will now be described for each of the gear speeds. The setting of the gear speeds is accomplished by switching oil lines through the movement of the spool of the manual valve 58 according to the movement of the shift lever 5a of the shifter 5, and using the electronic control unit ECU to set the operation of the first to fifth on/off solenoid valves 81 to 85 and first to third linear solenoid valves 86 to 88 as shown in Table 1. These first to fifth on/off solenoid valves 81 to 85 and first to third linear solenoid valves 86 to 88 are solenoid valves of the type that is normally closed, so they are open and operating, and generate a signal hydraulic pressure, when the power is on.

In Table 1, the symbols x and ○ indicate that the solenoids are either off or on. In the "On/off solenoid" column in Table 1, the letters A to E indicate the first to fifth on/off solenoid valves 81 to 85, respectively. R, 1, 2, 3, 4, and 5 in the "Clutch oil supply table" column indicate the reverse clutch 14, the LOW clutch 11, the $2^{nd}$ clutch 12, the $3^{rd}$ clutch 13, the $4^{th}$ clutch 14, and the $5^{th}$ clutch 15, respectively, and as mentioned above, the clutch 14 doubles as both the reverse clutch and the $4^{th}$ clutch. In this table, PL means that line pressure is supplied, and linear A to C refers to the first to third linear solenoid valves 86 to 88. The "Servo position" column indicates whether the drive/reverse selection hydraulic servo mechanism 70 is operated to the R (reverse) or D (drive) side.

TABLE 1

| Position | Mode | On/off solenoid | | | | | Clutch oil supply table | | | | | | Servo position |
| --- | --- | --- | --- | --- | --- | --- | --- | --- | --- | --- | --- | --- | --- |
| | | A | B | C | D | E | R | 1 | 2 | 3 | 4 | 5 | |
| P | P | X | ○ | X | X | ○ | | | | | | | R |
| | R inhibitor | ○ | X | ○ | X | X | | | | | | | D/R |
| R | R in-gear | X | ○ | X | X | ○ | linear A | | | | | | R |
| | R regular | ○ | ○ | X | X | ○ | PL | | | | | | R |
| | R inhibitor | ○ | X | ○ | X | X | | | | | | | D/R |
| N | N | X | ○ | ○ | X | X | | | | | | | D/R |
| | R inhibitor | ○ | X | ○ | X | X | | | | | | | D/R |
| D | LOW in-gear | X | ○ | ○ | X | X | | linear A | | linear C | | | D/R |
| | Low | ○ | ○ | ○ | X | X | | PL | | | | | D |
| | 1-2 | X | ○ | ○ | X | ○ X | | linear A | linear B | linear C | | | D |
| | $2^{nd}$ | X | ○ | X | ○ | ○ X | | | PL | | | | D |
| | 2–3 | ⊗ | ○ | ○ | ○ | ○ X | | | linear A | linear B | linear C | | D |
| | $3^{rd}$ | X | X | ○ | X | ○ X | | | | linear C | | | D |
| | 3–4 | X | X | X | X | ○ X | | | | linear A | linear C | linear B | D |
| | 4th | ○ | X | X | X | ○ X | | | | | linear B | | D |
| | 4–5 | ○ | X | X | ○ | ○ X | | | | | linear B | linear C | D |

TABLE 1-continued

| Signal list | | | | | | | | | | | | Servo |
|---|---|---|---|---|---|---|---|---|---|---|---|---|
| Posi- | On/off solenoid | | | | | Clutch oil supply table | | | | | | posi- |
| tion | Mode | A | B | C | D | E | R | 1 | 2 | 3 | 4 | 5 | tion |
| | 5th | ○ | X | ○ | ○ | ○ X | | | | | | linear C | D |

"Position" in Table 1 indicates the position in which the shift lever 5a is placed and the operating position of the manual valve 58. Provided positions include at least the park (P) position, reverse (R) position, neutral (N) position, and drive (D) position, and in this example, another two positions (those indicated by asterisks in FIG. 11) are provided as drive positions. In FIGS. 6 to 12, the manual valve 58 is shown in the N position.

Referring to Table 1, let us first describe the situation when the shift lever 5a is in the park (P) position. A spool 58a of the manual valve 58 in this case is moved to the position in which a groove 58b is in the P position. The modes in this P position include the P mode set when the vehicle is stationary, and an R inhibitor mode set when the shift lever 5a is moved to the part (P) position while the vehicle is moving.

First, in the P mode that is ordinarily set, the second and fifth on/off solenoid valves 82 and 85 (solenoid valves B and E) are on and opened, while the first, third, and fourth on/off solenoid valves 81, 83, and 84 (solenoid valves A, C, and D) are off and closed. As a result, the line pressure PL from the second on/off solenoid valve 82 is supplied through the oil line 102 to the right end of the second shift valve 62, and the spool of the second shift valve 62 is moved to the left. Also, the line pressure PL from the fifth on/off solenoid valve 85 is supplied through the oil line 105 to the left end of the fifth shift valve 68, and the spool of the fifth shift valve 68 is moved to the right. The oil line 105 can be connected to the right end of the lock-up shift valve 51 via a branch oil line 106a, and the operation of the lock-up clutch controlled by the fifth on/off solenoid valve 85, but this will not be described here.

Meanwhile, when the first on/off solenoid valve 81 is off, the oil line 101 is connected to the drain, and the spool of the first shift valve 60 is moved to the right as shown in the drawing by the biasing force of a spring. Similarly, when the third and fourth on/off solenoid valves 83 and 84 are off, the oil lines 103 and 104 are connected to the drain, the spool of the third shift valve 64 is moved to the right by the biasing force of a spring, and the spool of the fourth shift valve 66 is moved to the left by the biasing force of a spring.

When the shift lever is the park position, the manual valve 58 is in the P position (in FIG. 11, the position in which the groove 58b of the spool 58a is in the P position), and the line pressure PL from the oil line 100b is supplied to the oil lines 106 and 108. The oil line 106 is connected to the oil line 107 via the fifth shift valve 68, whose spool is moved to the right, and the oil line 107 is connected to the left oil chamber 72 of the drive/reverse selection hydraulic servo mechanism 70. Accordingly, the line pressure PL is supplied to the left oil chamber 72, and a rod 71 is moved to the right. The rod 71 is connected to a shift fork that actuates the dog-tooth clutch 16, and when the rod 71 moves to the right, the reverse driven gear 26c and the countershaft 3 are engaged by the dog-tooth clutch 16. An oil line 106a that branches off from the oil line 106 is connected to the right end of the D inhibitor valve 56, and moves the spool thereof to the left. The oil line 108 acts on the lock-up shift valve 51 and the lubrication relief valve 55, but will not be described.

In this state, the LOW clutch 11 is connected from the oil line 121 to the oil line 122 via the second shift valve 62, and the oil line 122 is connected to the drain at the third shift valve 64, and [the LOW clutch 11] is disengaged. The $2^{nd}$ clutch 12 is connected from the oil line 123 to the oil line 124 via the first shift valve 60, and is connected from the oil line 125 to the oil line 126 via the third shift valve 64. The oil line 126 is connected to the drain at the manual valve 58. Accordingly, the $2^{nd}$ clutch 12 is also disengaged. The $3^{rd}$ clutch 13 is connected from the oil line 127 to the oil line 128 via the first shift valve 60, the oil line 128 is connected to the oil line 129 via the second shift valve 62, and the oil line 129 is connected to the drain at the third shift valve 64. Therefore, the $3^{rd}$ clutch 13 is also disengaged.

The $4^{th}$ clutch 14 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, and the oil line 133 is connected to the drain via the manual valve 58, which is in the P position. Accordingly, the $4^{th}$ clutch 14 is also disengaged. The $5^{th}$ clutch 15 is connected to the drain at the first shift valve 60 via the oil line 134, and is disengaged. Therefore, the $5^{th}$ clutch 15 is also disengaged [sic].

Thus, in the P mode, the drive/reverse selection hydraulic servo mechanism 70 is set to the reverse side, and the LOW clutch 11, the $2^{nd}$ clutch 12, the $3^{rd}$ clutch 13, the $4^{th}$ clutch 14, and the $5^{th}$ clutch 15 are all disengaged, resulting in a neutral state.

The R inhibitor mode will now be described. In the R inhibitor mode, the first and third on/off solenoid valves 81 and 83 (solenoid valves A and C) are on and opened, while the second, fourth, and fifth on/off solenoid valves 82, 84, and 85 (solenoid valves B, D, and E) are off and closed. As a result, the line pressure PL from the first on/off solenoid valve 81 is supplied through the oil line 101 to the right end of the first shift valve 60, and the spool of the first shift valve 60 is moved to the left. Also, the line pressure PL from the third on/off solenoid valve 83 is supplied through the oil line 103 to the right end of the third shift valve 64, and the spool of the third shift valve 64 is moved to the left.

Meanwhile, since the second, fourth, and fifth on/off solenoid valves 82, 84, and 85 (solenoid valves B, D, and E) are off and closed, the second, fourth, and fifth shift valves 62, 66, and 68 are moved to the left or right as shown in the drawings by the biasing force of a spring.

In this state, the LOW clutch 11 is connected from the oil line 121 to the drain via the second shift valve 62, and is disengaged. The $2^{nd}$ clutch 12 is connected from the oil line 123 to the oil line 124 to the drain via the first shift valve 60, and is disengaged. The 3$^{rd}$ clutch 13 is connected from the oil line to the drain via the first shift valve 60, and is disengaged. The 4$^{th}$ clutch 14 is connected from the oil line 130 to the oil line 143 via the second shift valve 62, the oil line 143 is connected to the drain via the third shift valve 64, and the 4$^{th}$ clutch 14 is disengaged. The 5$^{th}$ clutch 15 is connected from the oil line 134 to the oil line 145 via the first shift valve 60, the oil line 145 is connected to the oil line 146 via the second shift valve 62, and the oil line is connected to the drain at the fourth shift valve 66. Therefore, the 5$^{th}$ clutch 15 is also disengaged. Thus, again in the R inhibitor mode, the LOW clutch 11, the 2$^{nd}$ clutch 12, the 3$^{rd}$ clutch 13, the 4$^{th}$ clutch 14, and the 5$^{th}$ clutch 15 are all disengaged, resulting in a neutral state.

In this state, the left oil chamber 72 of the drive/reverse selection hydraulic servo mechanism 70 is connected from the oil line 107 to the drain via the fifth shift valve 68. A right oil chamber 73 is connected from the oil line 140 to the drain via the D inhibitor valve 56. Thus, in the drive/reverse selection hydraulic servo mechanism 70, both the left oil chamber 72 and the right oil chamber 73 are connected to the drain, the axial force acting on the rod 71 is eliminated, and the state just prior [to this] is maintained. Specifically, in the R inhibitor mode, the drive/reverse selection hydraulic servo mechanism 70 is maintained in its immediately prior position in the neutral state.

When the shift lever 5a is put in the reverse (R) position, an R in-gear mode, an R regular mode, or an R inhibitor mode is selected and set, as shown in Table 1. The R in-gear mode is a mode which is set at the initial stage of setting the reverse gear, and which allows the transition to the reverse gear to be carried out smoothly. After this, a transition is made to the R regular mode. The R inhibitor mode is set when the shift lever 5a is put in the reverse (R) position while the vehicle is moving. Thus, the manual valve 58 moves to the reverse position when the shift lever 5a is put in the reverse (R) position.

First, the R inhibitor mode is the same as the R inhibitor mode set when [the shift lever 5a] is in the park (P) position, and the drive/reverse selection hydraulic servo mechanism 70 is maintained in its immediately prior position in a neutral state.

The R in-gear mode is the same as the above-mentioned P mode in terms of the on/off operation of the first to fifth on/off solenoid valves 81 to 85, the only difference being the spool position of the manual valve 58. Here, the 4$^{th}$ clutch 14 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 151 via the first shift valve 60, the oil line 151 is connected to the oil line 152 via the lock-up shift valve 51, and the oil line 152 is connected to the first linear solenoid valve 86 (linear A). Accordingly, in the R in-gear mode, the drive/reverse selection hydraulic servo mechanism 70 is set to the reverse side, the engagement of the 4$^{th}$ clutch 14 (that is, the reverse clutch) can be controlled by the first linear solenoid valve 86, and the initial stage of the reverse gear can be controlled.

The only difference between the R regular mode and the R in-gear mode is that in the former, the first on/off solenoid valve 81 is on. As a result, the 4$^{th}$ clutch 14 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 155 via the first shift valve 60, and the oil line 155 is connected to the oil line 100c via the fourth shift valve 66. Accordingly, in the R regular mode, the line pressure PL from the oil line 100c is supplied to the 4$^{th}$ clutch 14 to set the reverse gear.

When the shift lever 5a is put in the neutral (N) position, an N mode or an R inhibitor mode is set, as can be seen from Table 1. The R inhibitor mode is set the same as above. In the N mode, the on/off operation of the first on/off solenoid valves 81 and 82 is the opposite from that in the R inhibitor mode.

In this N mode, just as with the R inhibitor mode, the left oil chamber 72 of the drive/reverse selection hydraulic servo mechanism 70 is connected to the drain via the fifth shift valve 68. The right oil chamber 73 is connected from the oil line 140 to the drain via the D inhibitor valve 56. Thus, both the left oil chamber 72 and the right oil chamber 73 of the drive/reverse selection hydraulic servo mechanism 70 are connected to the drain, the axial force acting on the rod 71 is eliminated, and the state just prior [to this] is maintained.

In the N mode, the LOW clutch 11 is connected from the oil line 121 to the oil line 122 via the second shift valve 62, the oil line 122 is connected to the oil line 156 via the third shift valve 64, and the oil line 156 is connected to the drain via the manual valve 58, which is in the N position. Accordingly, the LOW clutch 11 is disengaged. The 2$^{nd}$ clutch 12 is connected from the oil line 123 to the oil line 124 via the first shift valve 60, the oil line 124 is connected to the oil line 125 via the second shift valve 62, the oil line 125 is connected to the oil line 157 via the third shift valve 64, and the oil line 157 is connected to the second linear solenoid valve 87 (linear B). Here, a main pressure supply oil line 158 of the second linear solenoid valve 87 is connected to and drains into the right oil chamber 73 of the drive/reverse selection hydraulic servo mechanism 70. Accordingly, the 2$^{nd}$ clutch 12 has no supply oil pressure, and the 2$^{nd}$ clutch 12 is also disengaged.

The 3$^{rd}$ clutch 13 is connected from the oil line 127 to the oil line 128 via the first shift valve 60, the oil line 128 is connected to the oil line 129 via the second shift valve 62, the oil line 129 is connected to the oil line 160 via the third shift valve 64, and the oil line 160 is connected to the third linear solenoid valve 88 (linear C). Here, a main pressure supply oil line 126 of the third linear solenoid valve 88 is drained via the manual valve, which is in the N position. Accordingly, the 3$^{rd}$ clutch 13 has no supply oil pressure, and the 3$^{rd}$ clutch 13 is also disengaged. The 4$^{th}$ clutch 14 is connected to the oil line 131 via the second shift valve 62, and the oil line 131 is connected to the drain at the fifth shift valve 68. Therefore, the 4$^{th}$ clutch 14 is also disengaged. The 5$^{th}$ clutch 15 is connected from the oil line 134 to the drain via the first shift valve 60, and is disengaged.

Thus, again in the N mode, the LOW clutch 11, the 2$^{nd}$ clutch 12, the 3$^{rd}$ clutch 13, the 4$^{th}$ clutch 14, and the 5$^{th}$ clutch 15 are all disengaged, resulting in a neutral state, and the axial force acting on the rod 71 is eliminated and the drive/reverse selection hydraulic servo mechanism 70 is maintained in its immediately prior state.

Next, we will discuss what happens when the shift lever 5a is moved from the neutral (N) position to the drive (D)

position. As can be seen from Table 1, ten different modes (such as a LOW in-gear mode) are set here for automatic shifting. The manual valve 58 in this case is moved to the D position.

First, let us describe the LOW in-gear mode that is set at the initial stage when the shift lever 5a is moved from the neutral (N) position to the drive (D) position. In this mode, the second and third on/off solenoid valves 82 and 83 are on, and the first, fourth, and fifth on/off solenoid valves 81, 84, and 85 are off. This is the same operation pattern as in the above-mentioned N mode, and the only difference from the N mode is that the spool 58a of the manual valve 58 is moved to the D position.

Accordingly, whereas in the N mode the LOW clutch 11 was connected to the drain via the manual valve 58, which was in the N position, in the LOW in-gear mode, [the LOW clutch 11] is connected to the first linear solenoid valve 86 as follows. The LOW clutch 11 is connected from the oil line 121 to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 151 via the first shift valve 60, the oil line 151 is connected to the oil line 152 via the lock-up shift valve 51, and the oil line 152 is connected to first linear solenoid valve 86. Accordingly, in the LOW in-gear mode, the engagement of the LOW clutch 11 can be controlled by the first linear solenoid valve 86.

In the LOW in-gear mode, the left oil chamber 72 of the drive/reverse selection hydraulic servo mechanism 70 is connected from the oil line 107 to the drain via the fifth shift valve 68. The right oil chamber 73 is connected from the oil line 140 to the drain via the D inhibitor valve 56. Thus, in the drive/reverse selection hydraulic servo mechanism 70, both the left oil chamber 72 and the right oil chamber 73 are connected to the drain, the axial force acting on the rod 71 is eliminated, and the drive/reverse selection hydraulic servo mechanism 70 is maintained in its immediately prior state in the LOW in-gear mode as well.

In the LOW mode, the first on/off solenoid valve 81 is turned on from the state in the LOW in-gear mode. As a result, the spool of the first shift valve 60 is moved to the left against the spring biasing force. As a result, the oil line 121 connected to the LOW clutch 11 is connected to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 155 via the first shift valve 60, and the oil line 155 is connected to the oil line 100c via the fourth shift valve 66. Accordingly, the line pressure from the oil line 100c is supplied to the LOW clutch 11 and this [clutch] is engaged.

The 1–2 mode is used in a 1–2 shift, and differs from the LOW mode in that the first on/off solenoid valve 81 is turned off. This is the same as the LOW in-gear mode; the engagement of the LOW clutch 11 is controlled by the first linear solenoid valve 86, and the engagement of the $2^{nd}$ clutch 12 and the $3^{rd}$ clutch 13 is controlled by the second and third linear solenoid valves 87 and 88. The hydraulic pressure supply routes in this case are determined on the basis of the operation of the shift valves in the hydraulic circuit diagram, just as above, and these will not be described in detail since they should be clear from the hydraulic circuit diagram. Since the fifth on/off solenoid valve 85 is used to control the operation of the lock-up clutch, it is turned on or off to control the lock-up clutch engagement.

The $2^{nd}$ mode, 2–3 mode, $3^{rd}$ mode, 3–4 mode, $4^{th}$ mode, 4–5 mode, and $5^{th}$ mode are set by turning on or off the first to fifth on/off solenoid valves 81 to 85 as shown in Table 1. The clutch pressures in this case are supplied as shown in Table 1. The hydraulic pressure supply routes in this case should also be clear from the hydraulic circuit diagram, and will therefore not be described in detail.

As described above, various modes can be set and automatic shift control performed by setting the shift lever position and controlling the operation of the first to fifth on/off solenoid valves 81 to 85 as in Table 1.

This device is structured such that the mode is switched by switching the position of the manual valve 58 to the P position, R position, N position, D position, etc., according to the movement of the shift lever 5a, but this device is characterized by the structure of oil lines having solenoid valves for the manual valve 58, and this structure will now be described. This oil line structure is characterized by an oil line for performing the engagement of the reverse clutch 14 (that is, the $4^{th}$ clutch 14) when the manual valve 58 is in the R position, and an oil line for performing the engagement of the reverse clutch 14 when the manual valve is in the D position. This will be described through reference to FIG. 13.

Figure 13:
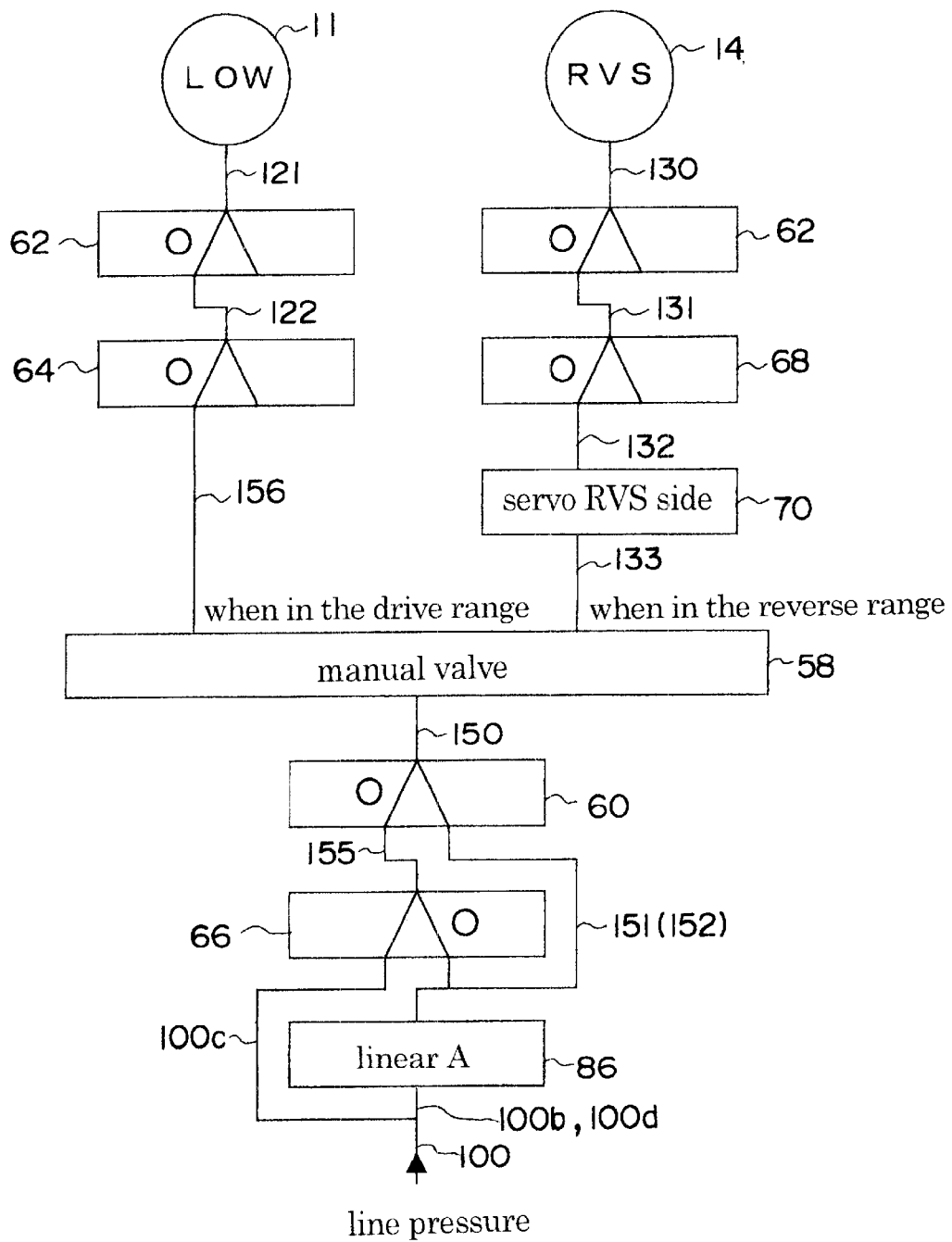
FIG. 13 is a schematic illustrating the oil lines linking the LOW clutch and the reverse clutch from the hydraulic pressure source in the above-mentioned hydraulic circuit.

FIG. 13 is a schematic illustrating the engagement hydraulic supply oil lines to the LOW clutch 11 and the reverse clutch ($4^{th}$ clutch) 14. First, in the R in-gear mode, the reverse clutch 14 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 151 via the first shift valve 60, the oil line 151 is connected to the oil line 152 via the lock-up shift valve 51 (this is not shown in FIG. 13), and the oil line 152 is connected to the first linear solenoid valve 86 (linear A). Accordingly, in the R in-gear mode, the drive/reverse selection hydraulic servo mechanism 70 is set to the reverse side, the engagement of the $4^{th}$ clutch 14 is controlled by the first linear solenoid valve 86 (linear A), and engagement control is carried out at the initial stage of the reverse gear.

Meanwhile, in the R regular mode, the reverse ($4^{th}$) clutch 14 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 155 via the first shift valve 60, and the oil line 155 is connected to the oil line 100c to which the line pressure PL is always supplied via the fourth shift valve 66. Accordingly, in the R regular mode the line pressure PL is supplied from the oil line 100c to the reverse clutch 14 so as to set to the reverse gear.

As can be seen from the above structure, in either the R in-gear mode or the R regular mode set in the R position of the manual valve 58, the oil lines from the manual valve 58 up to the reverse clutch 14 are shared, but the oil lines between the manual valve 58 and the line pressure supply source (the oil line 100) are different. As a result, engagement commencement can be suitably controlled in the R in-gear mode by fine control of the engagement hydraulic pressure with the first linear solenoid valve 86, while the clutch can be securely engaged in the R regular mode by supplying the line pressure PL just as it is. Accordingly, the first linear solenoid valve 86 can control at a low hydraulic pressure, which affords a simpler structure, and if the first linear solenoid valve 86 should malfunction, for instance, the reverse gear can be set by setting the R regular mode.

In the LOW in-gear mode, the LOW clutch 11 is connected from the oil line 121 to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 151 via the first shift valve 60, the oil line 151 is connected to the oil line 152 via the lock-up shift valve 51 (this is not shown in FIG. 13), and the oil line 152 is connected to the first linear solenoid valve 86. Accordingly, in the LOW in-gear mode, engagement of the LOW clutch 11 can be controlled by the first linear solenoid valve 86.

Meanwhile, in the LOW mode, the oil line 121 connected to the LOW clutch 11 is connected to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 155 via the first shift valve 60, and the oil line 155 is connected to the oil line 100c via the fourth shift valve 66. Accordingly, the line pressure from the oil line 100c is supplied to the LOW clutch 11 and this [clutch] is engaged.

Thus, in either the LOW in-gear mode or the LOW mode set in the D position of the manual valve 58, the oil lines from the manual valve 58 up to the LOW clutch 11 are shared, but the oil lines between the manual valve 58 and the line pressure supply source (the oil line 100) are different. As a result, engagement commencement can be suitably controlled in the LOW in-gear mode by fine control of the engagement hydraulic pressure with the first linear solenoid valve 86, while the clutch can be securely engaged in the LOW mode by supplying the line pressure PL just as it is. Accordingly, the first linear solenoid valve 86 can control at a low hydraulic pressure, which affords a simpler structure, and if the first linear solenoid valve 86 should malfunction, for instance, the drive gear can be set by setting the LOW mode.

As can be seen from the structure in FIG. 13, the engagement control hydraulic pressure supply oil lines for the reverse clutch 14 in the reverse modes (the R in-gear mode and the R regular mode) and the engagement control hydraulic pressure supply oil lines for the LOW clutch 11 in the LOW modes (the LOW in-gear mode and the LOW mode) are shared between the line pressure supply source and the manual valve 58. Accordingly, the oil line structure can be simpler than when the supply oil lines for the two modes are provided separately. In particular, the first linear solenoid valve 86 can be shared for control of the engagement commencement in either the drive mode or the reverse mode.

Figure 14A:
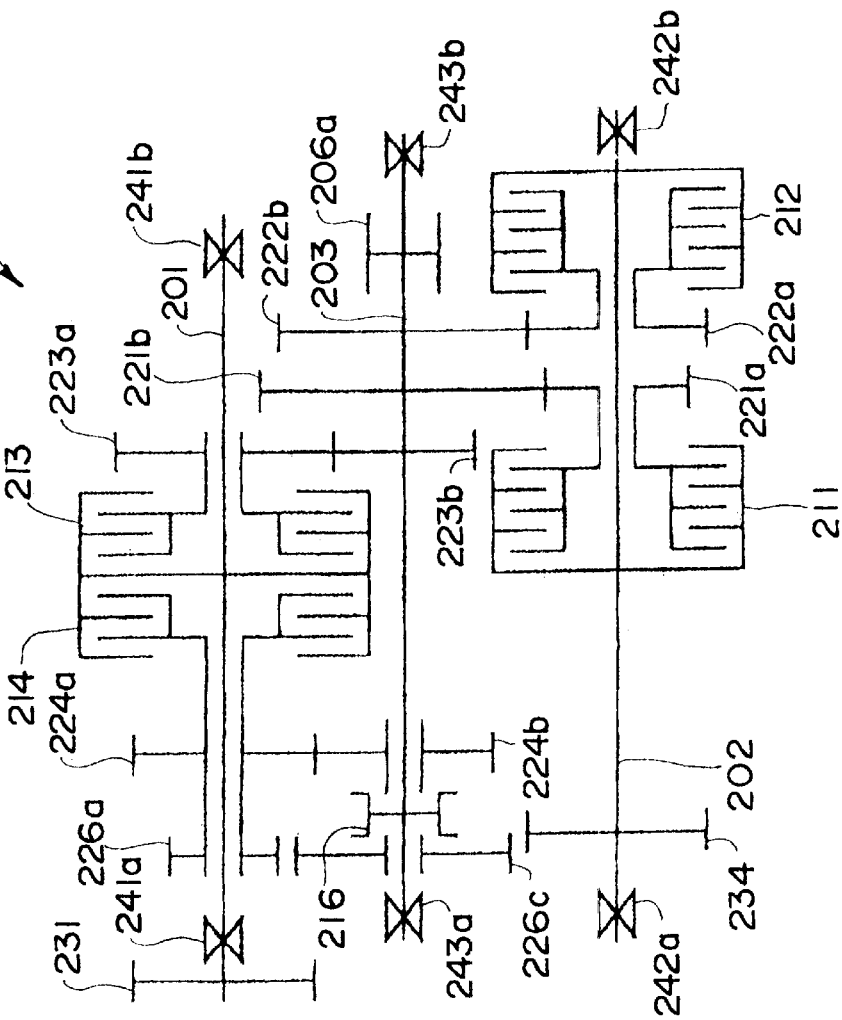
FIG. 14A and 14B show skeleton diagrams illustrating the power transmission system of a four-speed automatic transmission pertaining to the present invention.
Figure 14B:
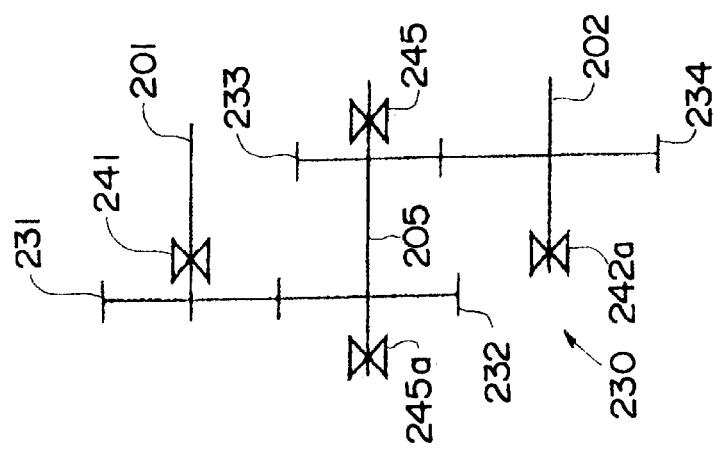
Figure 15:
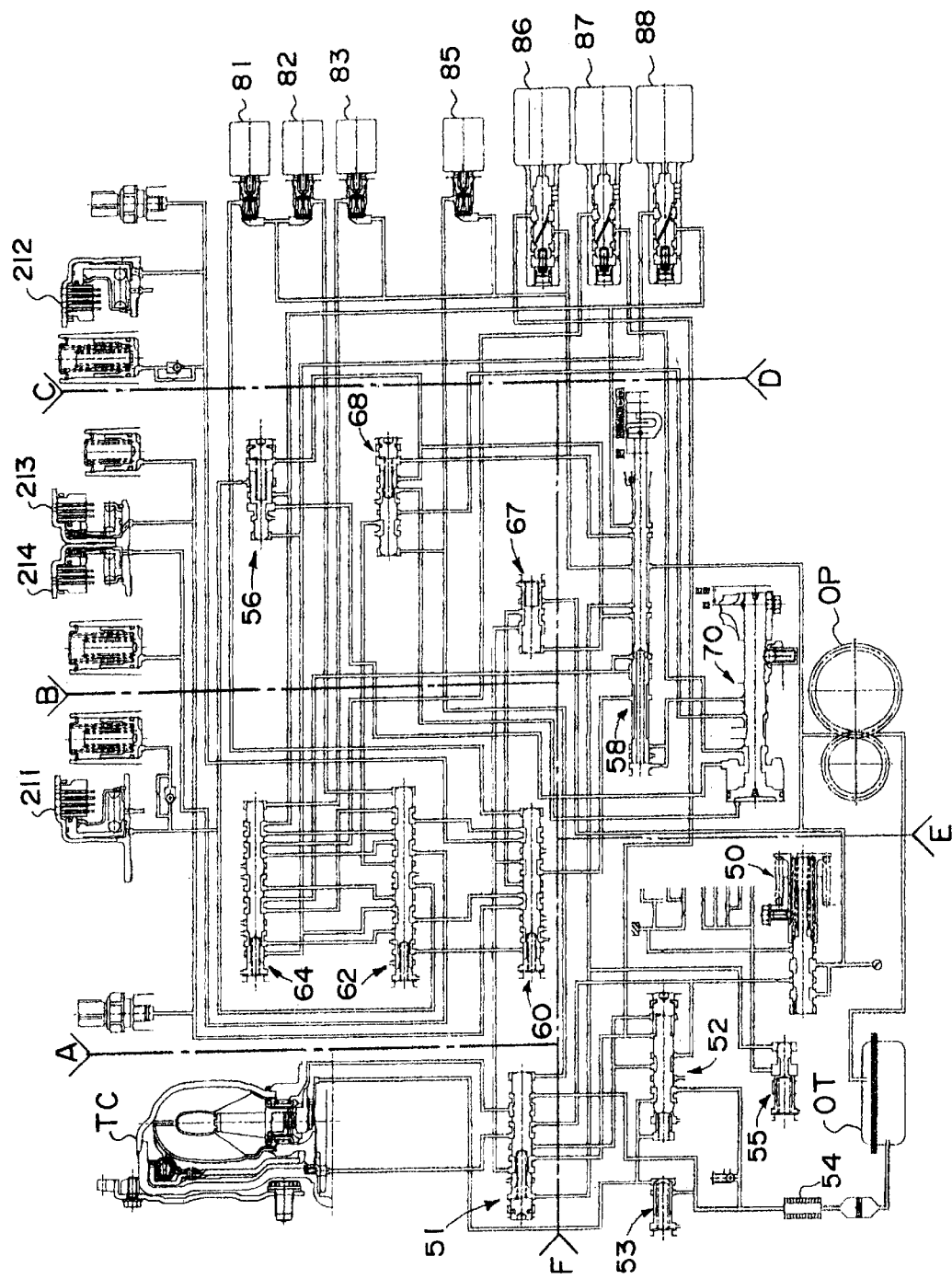
FIG. 15 is a hydraulic circuit diagram illustrating the structure of the shift control device in the above-mentioned four-speed automatic transmission.
Figure 16:
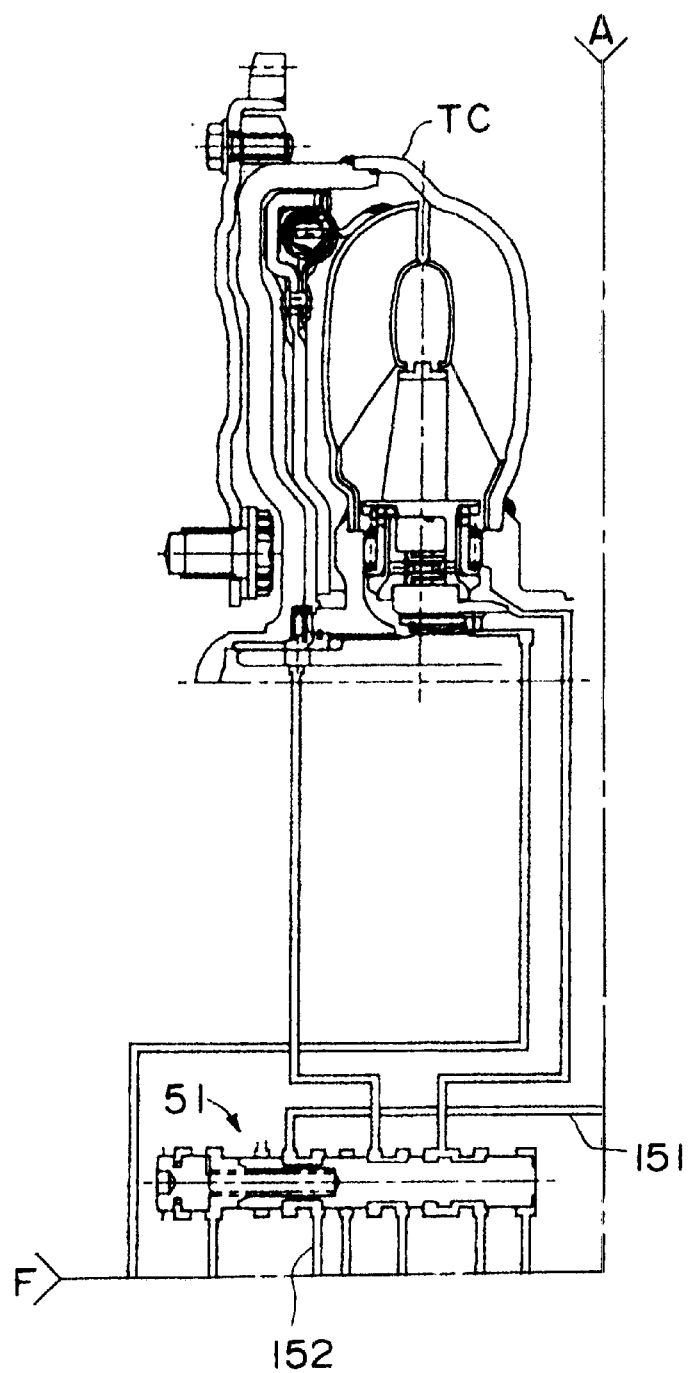
FIGS. 16 to 21 are hydraulic circuit diagrams illustrating enlarged detail views of the hydraulic circuit in FIG. 15.
Figure 17:
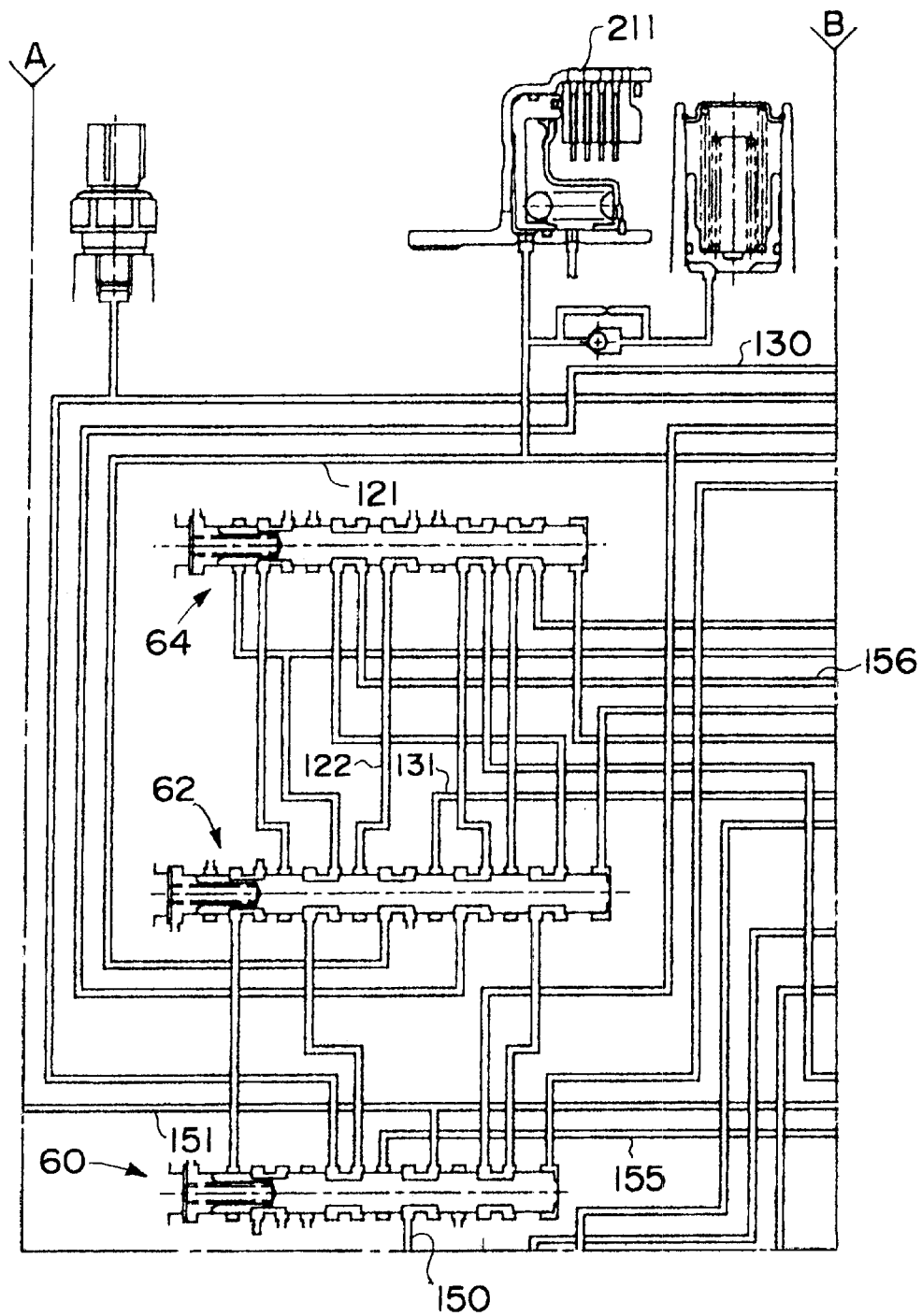
Figure 18:
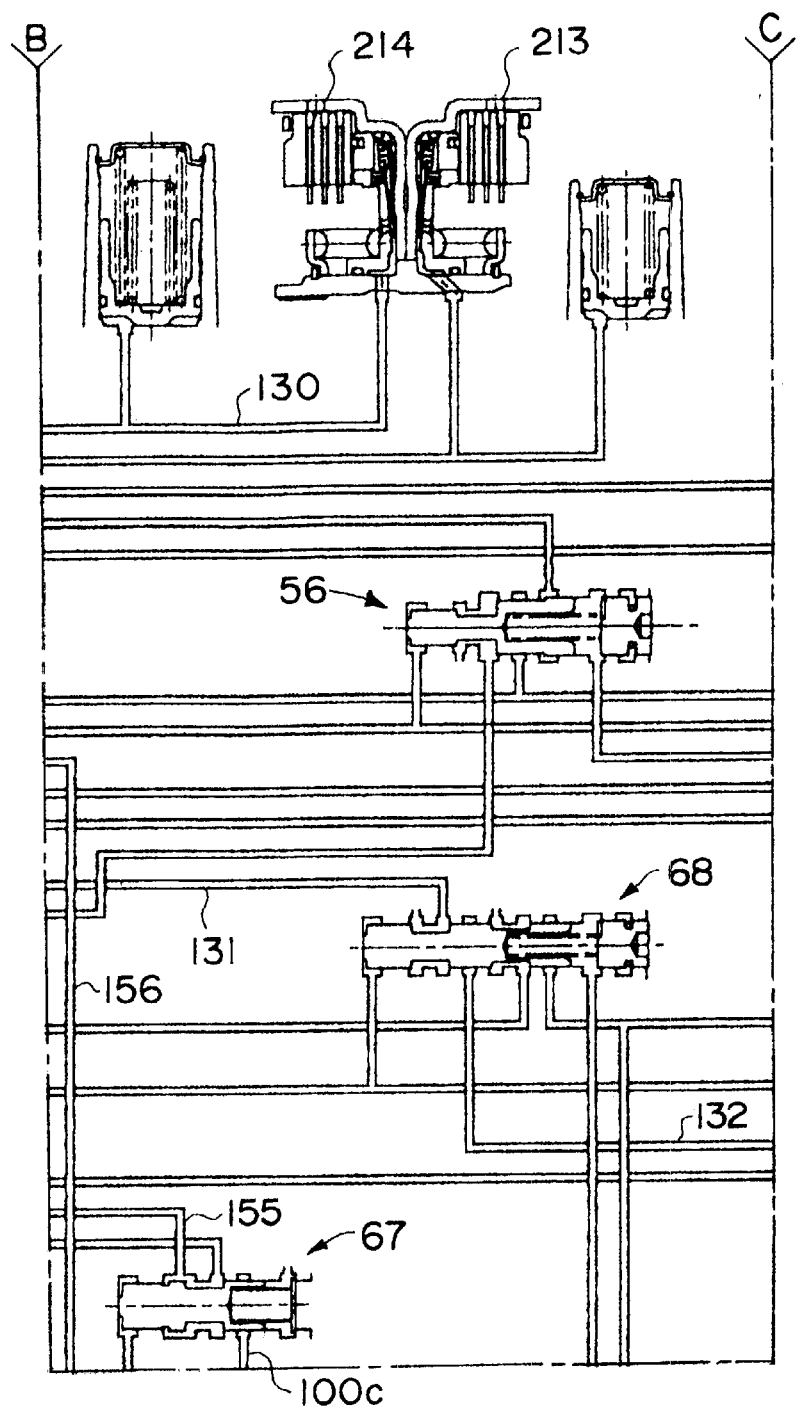
Figure 19:
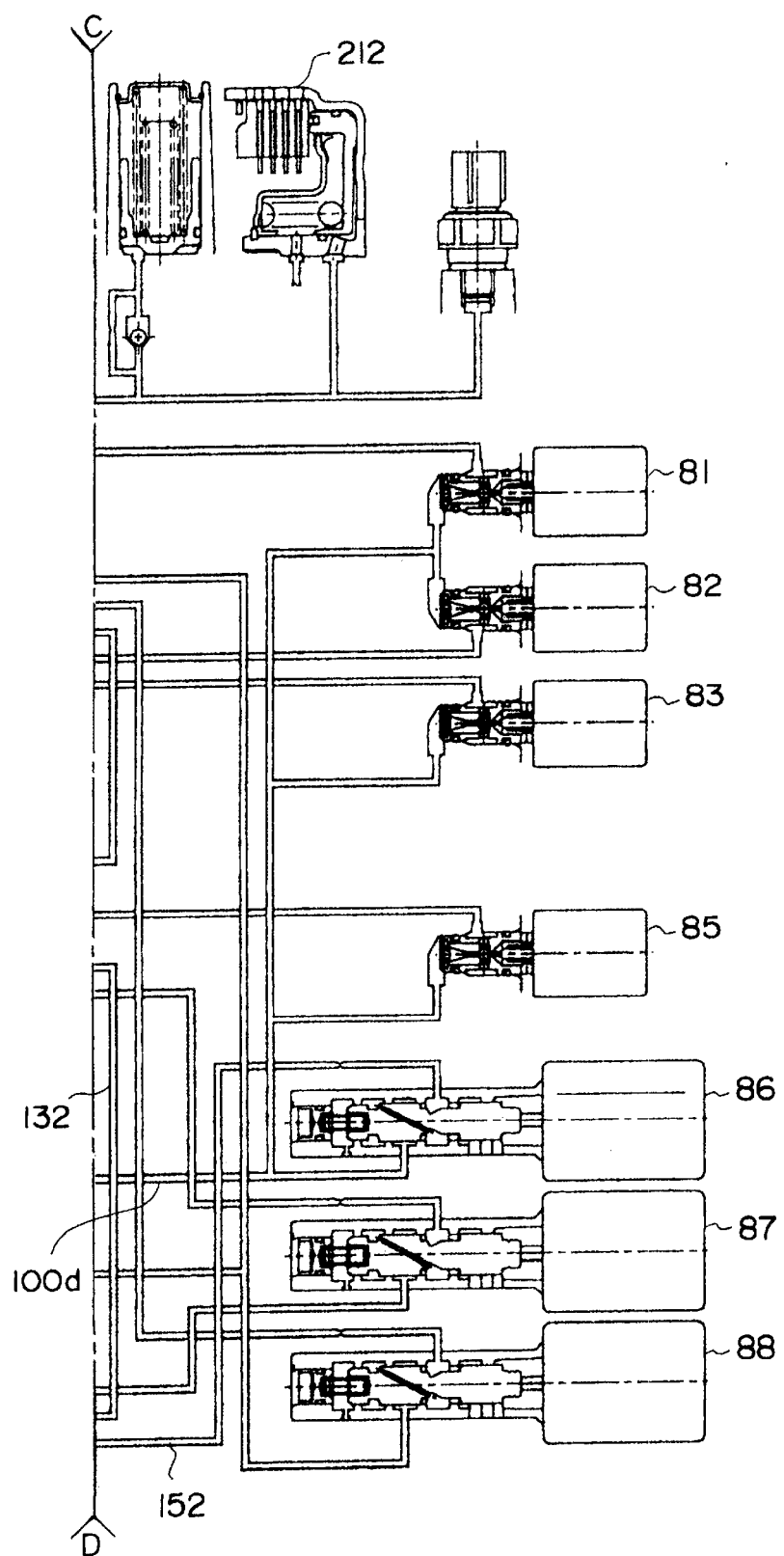
Figure 20:
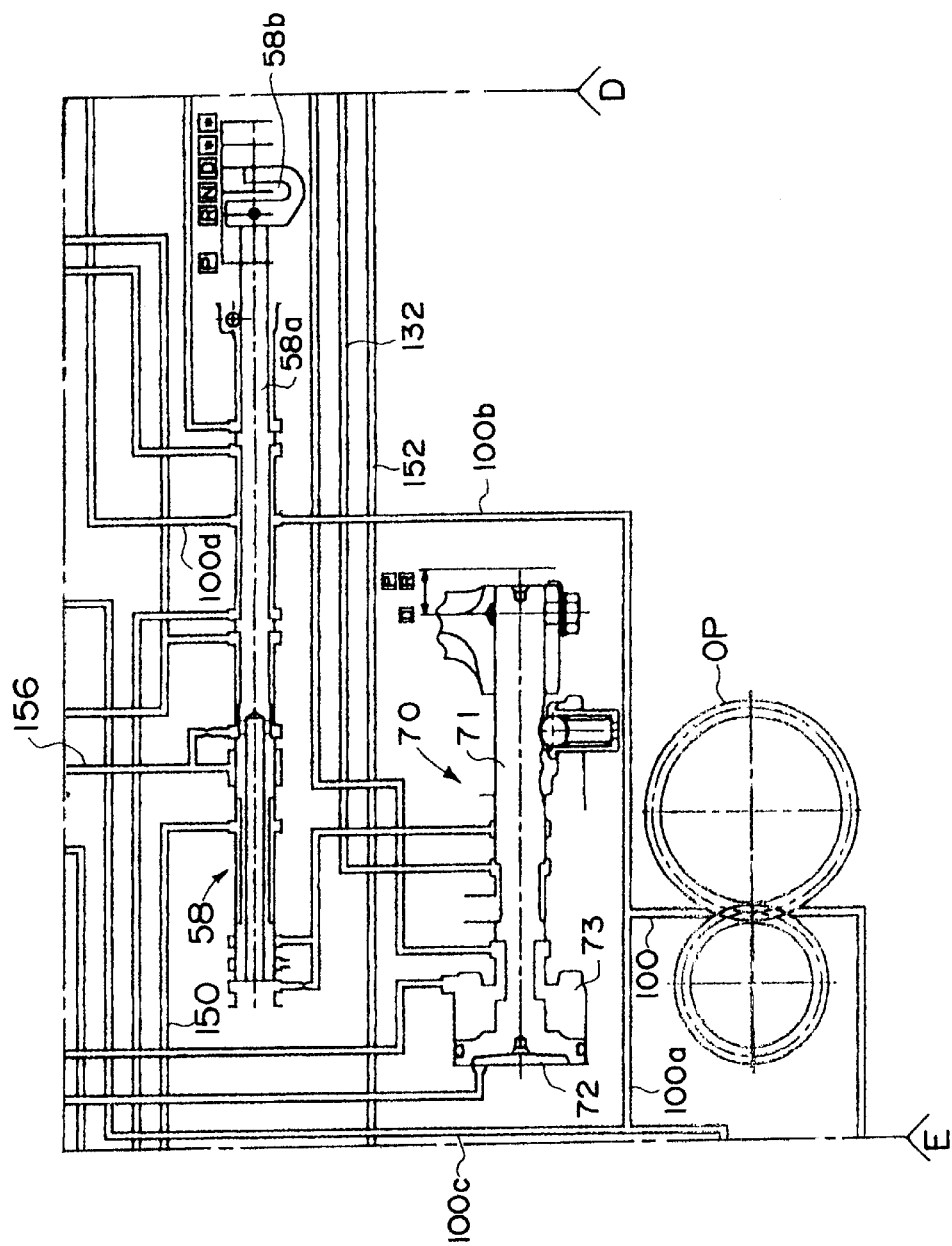
Figure 21:
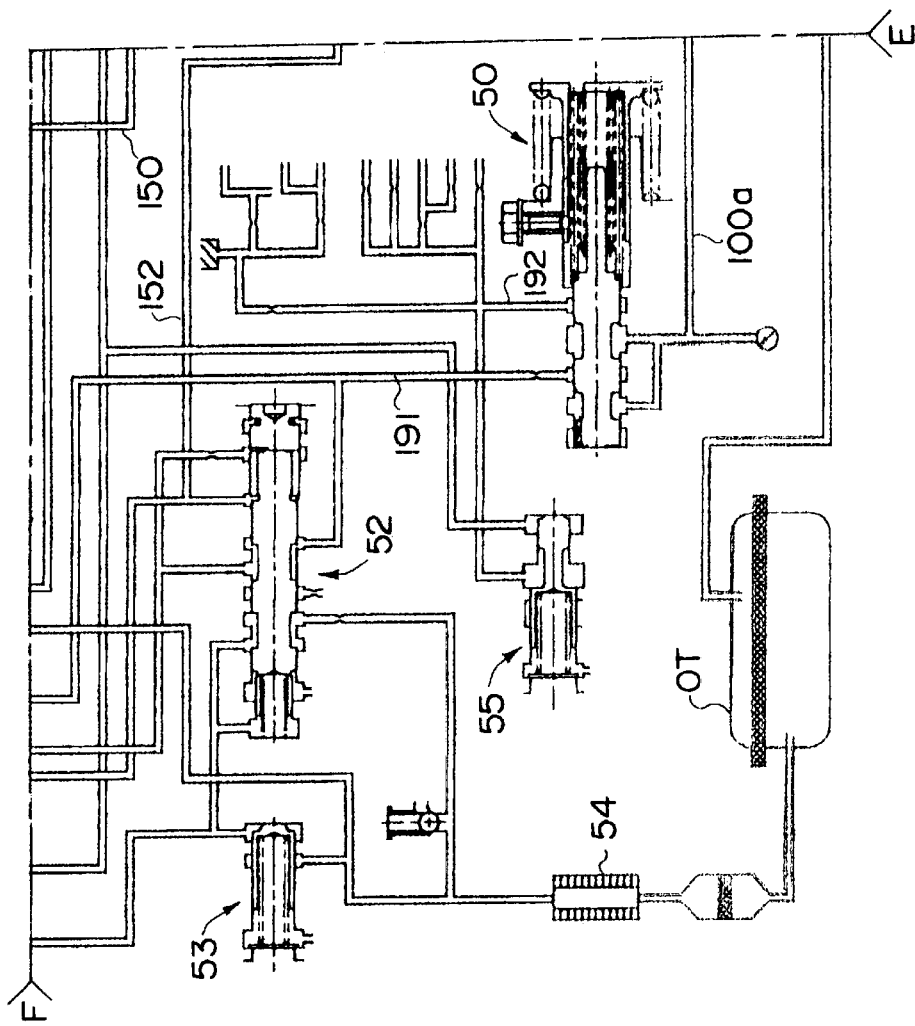

The above description was of an automatic transmission with five drive speeds and one reverse speed (5 AT), but now we will describe an automatic transmission with four drive speeds and one reverse speed (4 AT). This automatic transmission is constructed such that in the parallel shaft transmission mechanism TM shown in FIGS. 2 to 5, for example, the third-speed gear train 23a and 23b is removed from the first to fifth-speed gear train, the $3^{rd}$ clutch 13 that sets this gear train is removed, and the gear ratios of the rest of the gear train are configured so as to be suited to constituting the first to fourth speeds. This structure is shown in FIG. 14. The parallel shaft transmission mechanism TM that constitutes this transmission has a first input shaft 201, a second input shaft 202, a countershaft 203, and an idle shaft 205 extending parallel to each other, and the center-line positions of these shafts are indicated by S1, S2, S3, and S5, respectively, in FIG. 5.

The first input shaft 201 is coupled to the turbine of the torque converter TC, is rotatably supported by bearings 241a and 241b, receives the drive force from the turbine, and rotates along with the turbine. The first input shaft 201 is provided with a third-speed drive gear 223a, a $3^{rd}$ clutch 213, a $4^{th}$ clutch 214, a fourth-speed drive gear 224a, a reverse drive gear 226a, and a first connecting gear 231, in that order starting from the torque converter TC side (the right side in the drawing). The third-speed drive gear 223a is rotatably provided on the first input shaft 201, and is engaged with and disengaged from the first input shaft 201 by the hydraulically operated $3^{rd}$ clutch 213. The fourth-speed drive gear 224a and the reverse drive gear 226a are integrally linked and rotatably provided on the first input shaft 201, and are engaged with and disengaged from the first input shaft 201 by the hydraulically operated $4^{th}$ clutch 214. The first connecting gear 231 is linked with the first input shaft 201 in a cantilevered state, located to the outside of the bearing 241a rotatably supporting the first input shaft 201.

The second input shaft 202 is rotatably supported by bearings 242a and 242b, and is provided with a $2^{nd}$ clutch 212, a second-speed drive gear 222a, a LOW drive gear 221a, a LOW clutch 211, and a fourth connecting gear 234, in that order starting from the right side in the drawing. The second-speed drive gear 222a and the LOW drive gear 221a are rotatably provided on the second input shaft 202, and are engaged with and disengaged from the second input shaft 202 by the hydraulically operated $2^{nd}$ clutch 212 and LOW clutch 211. The fourth connecting gear 234 is linked to the second input shaft 202.

The idle shaft 205 is rotatably supported by bearings 245a and 245b, and is provided with a second connecting gear 232 and a third connecting gear 233 that are integral with this shaft. The second connecting gear 232 meshes with the first connecting gear 231, and the third connecting gear 233 meshes with the fourth connecting gear 234. These first to fourth connecting gears constitute a connecting gear train 230, and the rotation of the first input shaft 201 is constantly transmitted to the second input shaft 202 via the connecting gear train 230.

The countershaft 203 is rotatably supported by bearings 243a and 243b, and the final reduction drive gear 206a, a second-speed driven gear 222b, a LOW driven gear 221b, a third-speed driven gear 223b, a fourth-speed driven gear 224b, a dog-tooth clutch 216, and a reverse driven gear 226c are provided on this shaft, in that order starting from the right side in the drawing. The final reduction drive gear 206a, the second-speed driven gear 222b, the LOW driven gear 221b, and the third-speed driven gear 223b are linked to and rotate integrally with the countershaft 203. The fourth-speed driven gear 224b is rotatably provided on the countershaft 203. The reverse driven gear 226c is also rotatably provided on the countershaft 203. The dog-tooth clutch 216 operates in the axial direction, and can engage and disengage the fourth-speed driven gear 224b and the countershaft 203, or engage and disengage the reverse driven gear 226c and the countershaft 203.

As shown in the drawings, the LOW drive gear 221a meshes with the LOW driven gear 221b, the second-speed drive gear 222a meshes with the second-speed driven gear 222b, the third-speed drive gear 223a meshes with the third-speed driven gear 223b, and the fourth-speed drive gear 224a meshes with the fourth-speed driven gear 224b. Further, the reverse drive gear 226a meshes with the reverse driven gear 226c via a reverse idler gear.

Although not depicted in the drawings, the final reduction drive gear 206a meshes with a final reduction driven gear, and the rotation of the countershaft 203 is transmitted to the differential mechanism DF via this final reduction gear train.

The setting of the various gear speeds and the power transmission routes thereof in a transmission structured as above will now be described, but only briefly since these are the same as in FIGS. 6 to 12. With this transmission, in the drive range, the dog-tooth clutch 216 moves to the right in the drawing, and the fourth-speed driven gear 224b is engaged with the countershaft 203. In the reverse range, the dog-tooth clutch 216 moves to the left, and the reverse driven gear 226c is engaged with the countershaft 203.

Low gear is set by engagement of the LOW clutch 211, second gear is set by engagement of the $2^{nd}$ clutch 212, third gear is set by engagement of the $3^{rd}$ clutch 213, and fourth gear is set by engagement of the $4^{th}$ clutch 214, but this will not be described again. The reverse gear is set by engaging the $4^{th}$ clutch 214 and moving the dog-tooth clutch 216 to the left.

FIGS. 15 to 21 illustrate the hydraulic circuits that make up the shift control valve CV that controls shifting in an automatic transmission structured as above. These drawings will now be described. FIGS. 16 to 21 are enlarged detail views of the six portions of FIG. 15 indicated by one-dot chain lines A to F. In these hydraulic circuit diagrams, places where an oil line is open indicate that the line is connected to a drain. These hydraulic circuits are configured to share as much as possible with the hydraulic circuit for a five-speed automatic transmission shown in FIGS. 6 to 12, and shared components are labeled with the same numbers.

This device has an oil pump OP that discharges hydraulic oil from an oil tank OT. The oil pump OP is driven by the engine and supplies hydraulic oil to an oil line 100. The oil line 100 is connected to a main regulator valve 50 via an oil line 100a, and the pressure is adjusted at this valve, generating a line pressure PL in the oil lines 100 and 100a. This line pressure PL is supplied through an oil line 100b to a manual valve 58, and is supplied through an oil line 100c to a CPC valve 67. The oil line 100a is always connected to an oil line 100d via the port of the manual valve 58 (always connected, regardless of how the manual valve 58 is operating), and the line pressure PL is always supplied through the oil line 100d to first to third on/off solenoid valves 81 to 83, a fifth [on/off] solenoid valve 85, and a first linear solenoid valve 86.

Any extra oil from the main regulator valve 50 which makes the line pressure PL is supplied to an oil line 191, as well as to an oil line 192. The hydraulic oil supplied to the oil line 191 is controlled by a lock-up shift valve 51, a lock-up control valve 52, and a torque converter check valve 53, and is used in the lock-up control of the torque converter TC, after which it is returned to the oil tank OT through an oil cooler 54. The hydraulic oil supplied to the oil line 192 is adjusted in pressure by a lubrication relief valve 55 and supplied as lubricating oil to the various components.

The drawings show the LOW clutch 211, the $2^{nd}$ clutch 212, the $3^{rd}$ clutch 213, and the $4^{th}$ clutch 214 that make up the above-mentioned transmission, and show accumulators connected via oil lines to these various clutches. A drive/reverse selection hydraulic servo mechanism 70 is also provided for actuating the dog-tooth clutch 216.

A first shift valve 60, a second shift valve 62, a third shift valve 64, the CPC valve 67, a fifth shift valve 68, and a D inhibitor valve 56 are disposed as shown in the drawings in order to control the supply of hydraulic oil to the various clutches 211 to 214 and the drive/reverse selection hydraulic servo mechanism 70. The first to third and the fifth on/off solenoid valves 81 to 83 and 85 and first to third linear solenoid valves 86 to 88 are disposed as shown in the drawings in order to control the supply of hydraulic oil to the various clutches, etc., and to control the operation of these valves.

As can be seen from the above structure, this shift control valve differs from the shift control valve shown in FIGS. 6 to 12 in that there is no fourth on/off solenoid valve 84 or fourth shift valve 66, and the CPC valve 67 is provided instead.

The operation of a shift control device structured as above will now be described for each of the gear speeds. The setting of the gear speeds is accomplished by switching oil lines through the movement of the spool of the manual valve 58 according to the movement of the shift lever 5a of the shifter 5, and using the electronic control unit ECU to set the operation of the first to third and fifth on/off solenoid valves 81–83 and 85 and first to third linear solenoid valves 86 to 88 as shown in Table 2. These solenoid valves are all solenoid valves of the type that is normally closed, so they are open and operating, and generate a signal hydraulic pressure, when the power is on.

TABLE 2

| Posi- | | On/off solenoid | | | | Clutch oil supply table | | | | Servo posi- |
|---|---|---|---|---|---|---|---|---|---|---|
| tion | Mode | A | B | C | E | R | 1 | 2 | 3 | 4 | tion |
| P | P | X | ○ | X | ○ | | | | | | R |
| | R inhibitor | ○ | X | ○ | X | | | | | | D/R |
| R | R in-gear | X | ○ | X | ○ | linear A | | | | | R |
| | R regular | ○ | ○ | X | ○ | PL | | | | | R |
| | R inhibitor | ○ | X | ○ | X | | | | | | D/R |
| N | N | X | ○ | ○ | X | | | | | | D/R |
| | R inhibitor | ○ | X | ○ | X | | | | | | D/R |
| D | LOW in-gear | X | ○ | ○ | X | | linear A | | linear C | | D/R |
| | Low | ○ | ○ | ○ | X | | PL | | | | D |

(4AT Signal list)

TABLE 2-continued

| 4AT Signal list | | | | | | | | | | Servo |
|---|---|---|---|---|---|---|---|---|---|---|
| Posi- | On/off solenoid | | | | Clutch oil supply table | | | | | posi- |
| tion Mode | A | B | C | E | R | 1 | 2 | 3 | 4 | tion |
| 1–2 | X | ○ | ○ | ○ X | | A | | linear B | linear C | D |
| 2nd | X | ○ | X | ○ X | | A | PL | | | D |
| 2–3 | X | ○ | ○ | ○ X | | A | | linear B | linear C | D |
| 3rd | X | X | ○ | ○ X | | | | | linear C | D |
| 3–4 | X | X | X | ○ X | | | A | | linear C | linear B | D |
| 4th | ○ | X | X | ○ X | | | A | | | linear B | D |

As shown in Table 2, the various modes are set by operating the shift lever 5a and turning on or off the various on/off solenoid valves 81 to 83 and 85. The hydraulic pressure supply routes here will not be described in detail since they should be clear from the hydraulic circuit diagram.

As can be seen from a comparison of the structure described above with the structure shown in FIGS. 6 to 12, since the difference between the two is whether the application is a five-speed automatic transmission or a four-speed automatic transmission, the required valves will be slightly different, but the rest of the components can be shared. Accordingly, as can be seen from Tables 1 and 2, the operating control patterns of the various solenoid valves can be shared.

This device (a shift control device for a four-speed automatic transmission) is characterized by an oil line for performing the engagement of the reverse clutch 214 (that is, the $4^{th}$ clutch 214) when the manual valve 58 is in the R position, and an oil line for performing the engagement of the reverse clutch 214 when the manual valve is in the D position. To describe this characteristic structure, we will describe the R in-gear mode, the R regular mode, the LOW in-gear mode, and the LOW mode.

First, in the R in-gear mode, the reverse clutch 214 (that is, the $4^{th}$ clutch 214) is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 151 via the first shift valve 60, the oil line 151 is connected to the oil line 152 via the lock-up shift valve 51, and the oil line 152 is connected to the first linear solenoid valve 86 (linear A). Accordingly, in the R in-gear mode, the drive/reverse selection hydraulic servo mechanism 70 is set to the reverse side, the engagement of the $4^{th}$ clutch 14 (that is, the reverse clutch) is controlled by the first linear solenoid valve 86 (linear A), and engagement control is carried out at the initial stage of the reverse gear.

The R regular mode differs from the R in-gear mode in that the first on/off solenoid valve 81 is on. As a result, the $4^{th}$ clutch 214 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 155 via the first shift valve 60, and the oil line 155 is connected to the oil line 100c via the CPC valve 67, whose spool has been moved to the right. Accordingly, in the R regular mode, the line pressure PL from the oil line 100c is supplied to the reverse clutch ($4^{th}$ clutch) 214 to set the reverse gear.

We will now describe the LOW in-gear mode, which is set by moving the shift lever 5a to the drive (D) position. In the LOW in-gear mode, the LOW clutch 211 is connected from the oil line 121 to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 151 via the first shift valve 60, the oil line 151 is connected to the oil line 152 via the lock-up shift valve 51, and the oil line 152 is connected to first linear solenoid valve 86. Accordingly, in the LOW in-gear mode, the engagement of the LOW clutch 211 can be controlled by the first linear solenoid valve 86.

In the LOW mode, the first on/off solenoid valve 81 is turned on from the state in the LOW in-gear mode. As a result, the spool of the first shift valve 60 is moved to the left against the spring biasing force. As a result, the oil line 121 connected to the LOW clutch 11 is connected to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 155 via the first shift valve 60, and the oil line 155 is connected to the oil line 100c via the CPC valve 67. Accordingly, the line pressure from the oil line 100c is supplied to the LOW clutch 211 and this [clutch] is engaged.

Figure 22:
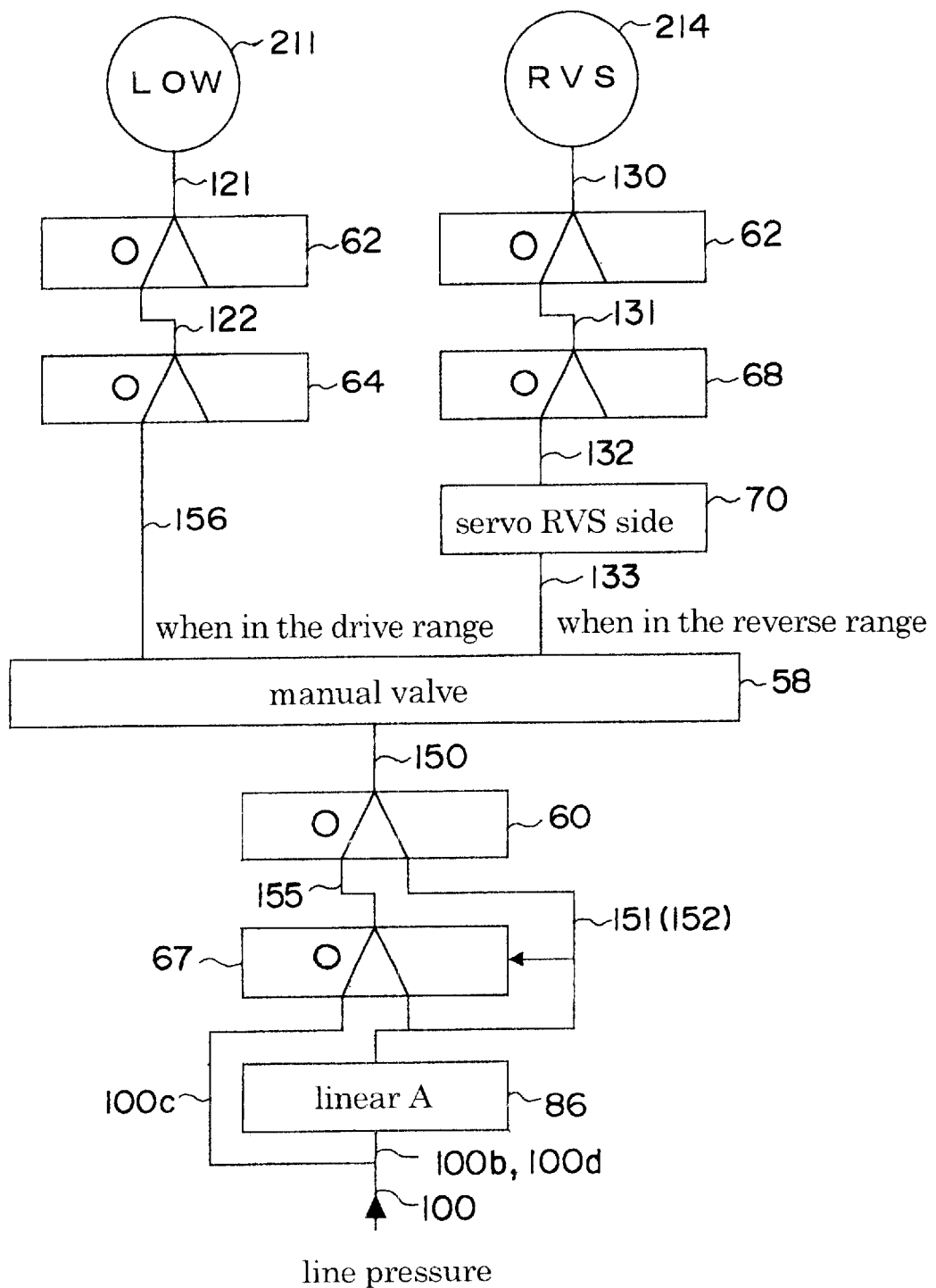
FIG. 22 is a schematic illustrating the oil lines linking the LOW clutch and the reverse clutch from the hydraulic pressure source in the above-mentioned hydraulic circuit.

The oil line structure set as above, that is, the oil lines for supplying engagement hydraulic pressure to the LOW clutch 211 and the reverse clutch ($4^{th}$ clutch) 214, is schematically shown in FIG. 22, and this oil line structure will be described in detail through reference to FIG. 22.

First, in the R in-gear mode, the reverse clutch 214 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 151 via the first shift valve 60, the oil line 151 is connected to the oil line 152 via the lock-up shift valve 51 (this is not shown in FIG. 22), and the oil line 152 is connected to the first linear solenoid valve 86 (linear A). Accordingly, in the R in-gear mode, the drive/reverse selection hydraulic servo mechanism 70 is set to the reverse side, the engagement of the reverse clutch 214 is controlled by the first linear solenoid valve 86 (linear A), and engagement control is carried out at the initial stage of the reverse gear.

Meanwhile, in the R regular mode, the reverse ($4^{th}$) clutch 214 is connected from the oil line 130 to the oil line 131 via the second shift valve 62, the oil line 131 is connected to the oil line 132 via the fifth shift valve 68, the oil line 132 is connected to the oil line 133 via the drive/reverse selection hydraulic servo mechanism 70, whose rod 71 has been moved to the right, the oil line 133 is connected to the oil line 150 via the manual valve 58, which is in the R position, the oil line 150 is connected to the oil line 155 via the first shift valve 60, and the oil line 155 is connected to the oil line 100c to which the line pressure PL is always supplied via the CPC valve 67. Accordingly, in the R regular mode the line pressure PL is supplied from the oil line 100c to the reverse clutch 214 so as to set to the reverse gear.

As can be seen from the above structure, in either the R in-gear mode or the R regular mode set in the R position of the manual valve 58, the oil lines from the manual valve 58 up to the reverse clutch 214 are shared, but the oil lines between the manual valve 58 and the line pressure supply source (the oil line 100) are different. As a result, engagement commencement can be suitably controlled in the R in-gear mode by fine control of the engagement hydraulic pressure with the first linear solenoid valve 86, while the clutch can be securely engaged in the R regular mode by supplying the line pressure PL just as it is. Accordingly, the first linear solenoid valve 86 can control at a low hydraulic pressure, which affords a simpler structure, and if the first linear solenoid valve 86 should malfunction, for instance, the reverse gear can be set by setting the R regular mode.

In the LOW in-gear mode, the LOW clutch 211 is connected from the oil line 121 to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 151 via the first shift valve 60, the oil line 151 is connected to the oil line 152 via the lock-up shift valve 51 (this is not shown in FIG. 22), and the oil line 152 is connected to the first linear solenoid valve 86. Accordingly, in the LOW in-gear mode, engagement of the LOW clutch 211 can be controlled by the first linear solenoid valve 86.

Meanwhile, in the LOW mode, the oil line 121 connected to the LOW clutch 211 is connected to the oil line 122 via the second shift valve 62, the oil line 122 is connected to the oil line 156 via the third shift valve 64, the oil line 156 is connected to the oil line 150 via the manual valve 58, which is in the D position, the oil line 150 is connected to the oil line 155 via the first shift valve 60, and the oil line 155 is connected to the oil line 100c via the CPC valve 67. Accordingly, the line pressure from the oil line 100c is supplied to the LOW clutch 211 and this [clutch] is engaged.

Thus, in either the LOW in-gear mode or the LOW mode set in the D position of the manual valve 58, the oil lines from the manual valve 58 up to the LOW clutch 211 are shared, but the oil lines between the manual valve 58 and the line pressure supply source (the oil line 100) are different. As a result, engagement commencement can be suitably controlled in the LOW in-gear mode by fine control of the engagement hydraulic pressure with the first linear solenoid valve 86, while the clutch can be securely engaged in the LOW mode by supplying the line pressure PL just as it is. Accordingly, the first linear solenoid valve 86 can control at a low hydraulic pressure, which affords a simpler structure. Furthermore, in the case of a four-speed automatic transmission (4 AT), the CPC valve 67 cannot move to the right and line pressure will not reach the LOW clutch 211 if the output pressure of the linear solenoid valve 86 is low, so the drive gear cannot be set. In the 4 AT reverse range, the CPC valve 67 always moves to the right, and the reverse gear can be set even when the output of the linear solenoid valve 86 is low in pressure.

As can be seen from the structure in FIG. 22, the engagement control hydraulic pressure supply oil lines for the reverse clutch 214 in the reverse modes (the R in-gear mode and the R regular mode) and the engagement control hydraulic pressure supply oil lines for the LOW clutch 211 in the LOW modes (the LOW in-gear mode and the LOW mode) are shared between the line pressure supply source and the manual valve 58. Accordingly, the oil line structure can be simpler than when the supply oil lines for the two modes are provided separately. In particular, the first linear solenoid valve 86 can be shared for control of the engagement commencement in either the drive mode or the reverse mode.

As described above, with the present invention, the hydraulic control valve has first and second main pressure oil lines disposed in parallel between the main pressure supply source and the manual valve, and a plurality of engagement element-side oil lines disposed between the drive friction engagement element and the reverse friction engagement element, and a linear solenoid valve that allows the main pressure to be set as desired is provided to at least one of the first and second main pressure oil lines, so the engagement control hydraulic pressure from the first and second main pressure oil lines can be selectively supplied to the drive friction engagement element or the reverse friction engagement element on the basis of the operation of the manual valve. As a result, the first and second main pressure oil lines can be used for both drive and reverse control, so fewer parts are needed for the shift control device, and control is simpler.

Accordingly, it is preferable if the above-mentioned first and second main pressure oil lines are linked to the drive friction engagement element when the manual valve is in the drive position, and are linked to the reverse friction engagement element when the manual valve is in the reverse position.

With the present invention, if the first and second main pressure oil lines are used selectively, it is possible, for example, to control the start of engagement by precisely controlling the engagement hydraulic pressure using a main pressure oil line having a linear solenoid valve, and upon completion of the engagement start control, to supply the line pressure directly using another main pressure oil line, so that the friction engagement element is securely engaged. As a result, the linear solenoid valve is controlled at a lower pressure, and the structure thereof can be simpler. Furthermore, even if there is a malfunction of the linear solenoid valve, the friction engagement element can still be engaged by using the other main pressure oil line, so reliability is better.

It is also preferable if a mechanical clutch mechanism for mechanically switching the drive power transmission path and the reverse power transmission path, and a drive/reverse selection hydraulic servo mechanism that hydraulically controls the operation of this mechanical clutch mechanism, are provided, and if the drive/reverse selection hydraulic servo mechanism is disposed within the hydraulic control valve, and the reverse engagement element oil line that connects the reverse friction engagement element to the manual valve is formed through the drive/reverse selection hydraulic servo mechanism operating on the reverse side. This keeps the reverse friction engagement element from being engaged unless the drive/reverse selection hydraulic servo mechanism is switched to the reverse side, which improves reliability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control device for an automatic transmission, comprising:
    a power transmission mechanism having a drive power transmission path for transmitting drive power, and a reverse power transmission path for transmitting reverse power;
    a drive friction engagement element for selecting the drive power transmission path, and a reverse friction engagement element for selecting the reverse power transmission path; and
    a hydraulic control valve for controlling the supply of engagement control hydraulic pressure to the drive friction engagement element and the reverse friction engagement element,
    wherein the hydraulic control valve has a main pressure supply source for supplying the main pressure of the engagement control hydraulic pressure, a manual valve that is switched according to shift lever operation, first and second main pressure oil lines disposed in parallel between the main pressure supply source and the manual valve, and a plurality of engagement element oil lines disposed between the manual valve and the drive and reverse friction engagement elements, and
    a linear solenoid valve that allows the main pressure to be set as desired is provided in at least one of the first and second main pressure oil lines.

2. The shift control device according to claim 1,
    wherein a shift valve is provided for selecting one of the first and second main pressure oil lines, and
    the shift valve is structured such that:
        at the initial stage of engaging the drive or reverse friction engagement element, the linear solenoid valve controls the engagement hydraulic pressure by selecting from among the first and second main pressure oil lines the oil line in which the linear solenoid valve is disposed, and
        at the stage at which the drive or reverse friction engagement element is completely engaged, the main pressure is supplied directly as the engagement hydraulic pressure by selecting from among the first and second main pressure oil lines the oil line in which the linear solenoid valve is not disposed.

3. The shift control device according to claim 1,
    wherein the first and second main pressure oil lines are linked to the drive friction engagement element when the manual valve is located in the drive position, and are linked to the reverse friction engagement element when the manual valve is located in the reverse position.

4. The shift control device according to claim 3,
    wherein at least a LOW in-gear mode and a LOW mode are set when the manual valve is located in the drive position,
    in the LOW in-gear mode, the linear solenoid valve controls the engagement hydraulic pressure by selecting from among the first and second main pressure oil lines the oil line in which the linear solenoid valve is disposed, and
    in the LOW mode, the main pressure is supplied directly as the engagement hydraulic pressure by selecting from among the first and second main pressure oil lines the oil line in which the linear solenoid valve is not disposed.

5. The shift control device according to claim 3,
    wherein at least an R in-gear mode and an R regular mode are set when the manual valve is located in the reverse position,
    in the R in-gear mode, the linear solenoid valve controls the engagement hydraulic pressure by selecting from among the first and second main pressure oil lines the oil line in which the linear solenoid valve is disposed, and
    in the R steady state mode, the main pressure is supplied directly as the engagement hydraulic pressure by selecting from among the first and second main pressure oil lines the oil line in which the linear solenoid valve is not disposed.

6. The shift control device according to claim 1, comprising:
    a mechanical clutch mechanism for mechanically switching and selecting the drive power transmission path and the reverse power transmission path, and a drive/reverse selection hydraulic servo mechanism that hydraulically controls the operation of the mechanical clutch mechanism,
    wherein the drive/reverse selection hydraulic servo mechanism is disposed within the hydraulic control valve, and
    the reverse engagement element oil line that connects the reverse friction engagement element to the manual valve is formed through the drive/reverse selection hydraulic servo mechanism operating on the reverse side.

7. The shift control device according to claim 6, wherein power is transmitted through the reverse power transmission path when the reverse friction engagement element is engaged and the reverse power transmission path has been selected by the mechanical clutch mechanism.

8. The shift control device according to claim 6, wherein the reverse engagement element oil line that connects the reverse friction engagement element to the manual valve is formed through the drive/reverse selection hydraulic servo mechanism, and the opening and closing of the reverse engagement element oil line is controlled according to the operation of the drive/reverse selection hydraulic servo mechanism, and when the drive/reverse selection hydraulic servo mechanism is operated such that the reverse power transmission path is selected by the mechanical clutch mechanism, the reverse engagement element oil line is opened up so that the reverse friction engagement element communicates with the manual valve.

* * * * *